April 25, 1967 F. S. WEISS 3,315,331
APPARATUS FOR MANUFACTURING CAPACITORS
Original Filed June 15, 1961 21 Sheets-Sheet 1

INVENTOR.
FELIX S. WEISS
BY
W. D. Keith,
ATTORNEY

April 25, 1967 F. S. WEISS 3,315,331
APPARATUS FOR MANUFACTURING CAPACITORS
Original Filed June 15, 1961 21 Sheets-Sheet 2

INVENTOR.
FELIX S. WEISS
BY W. D. Keith,
ATTORNEY

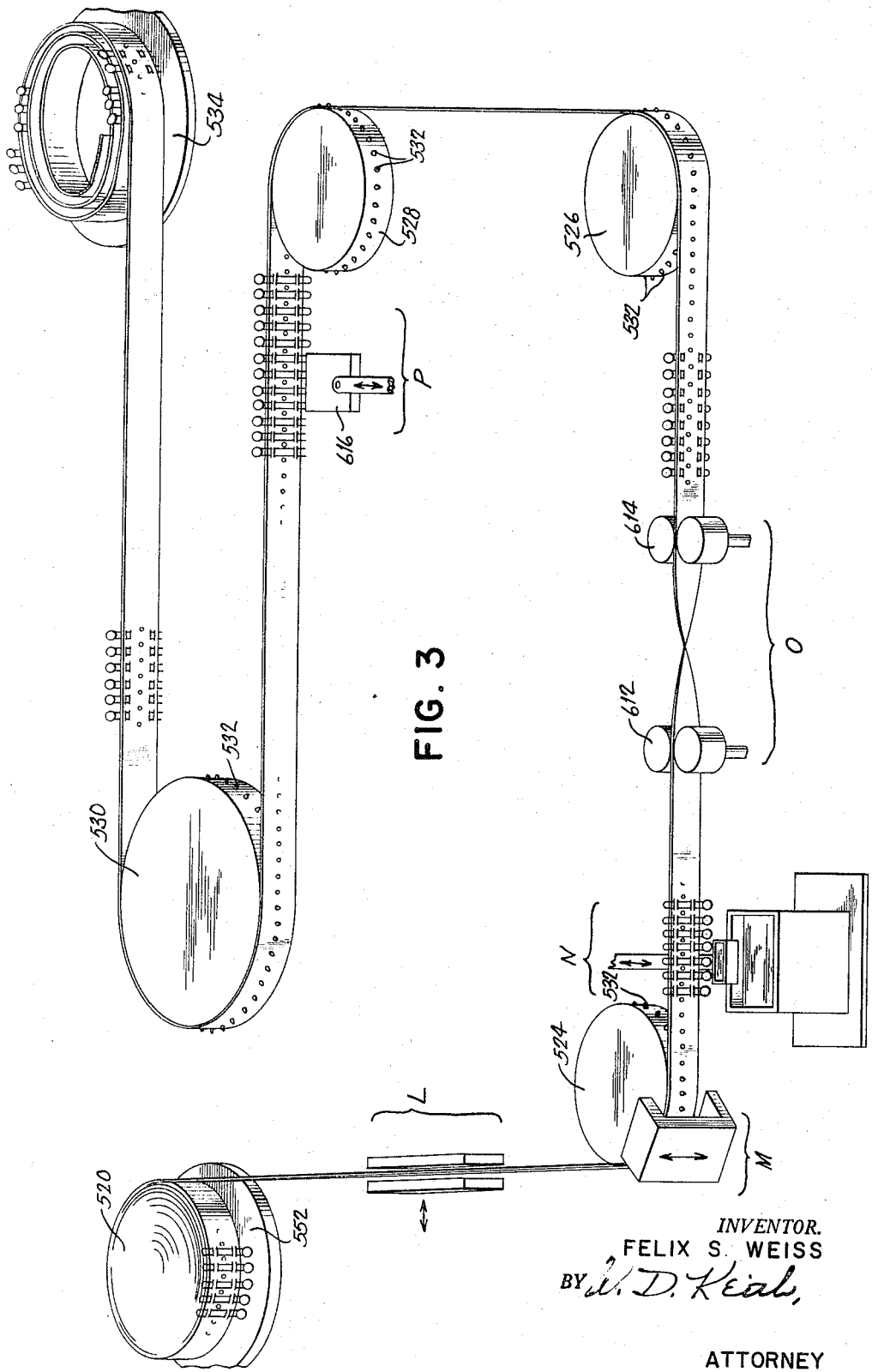

INVENTOR.
FELIX S. WEISS
BY W. D. Keith
ATTORNEY

April 25, 1967 F. S. WEISS 3,315,331
APPARATUS FOR MANUFACTURING CAPACITORS
Original Filed June 15, 1961 21 Sheets-Sheet 5
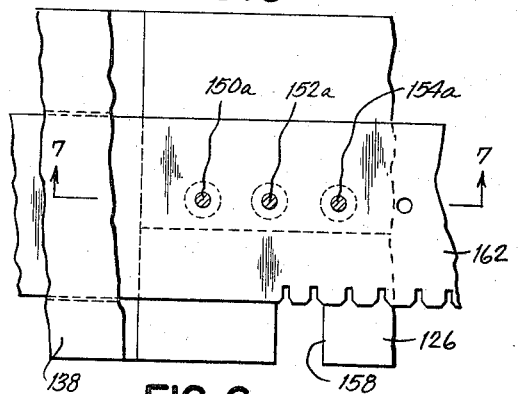
FIG. 5
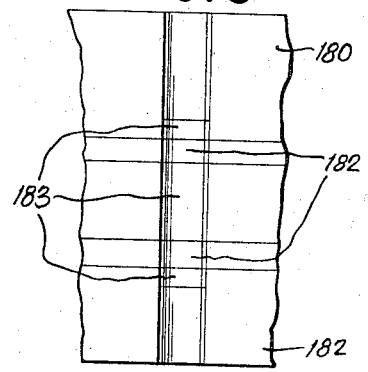
FIG. 8
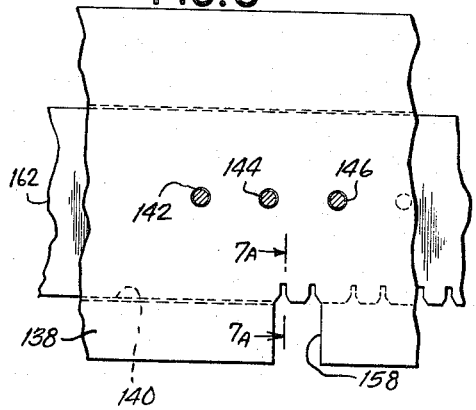
FIG. 6
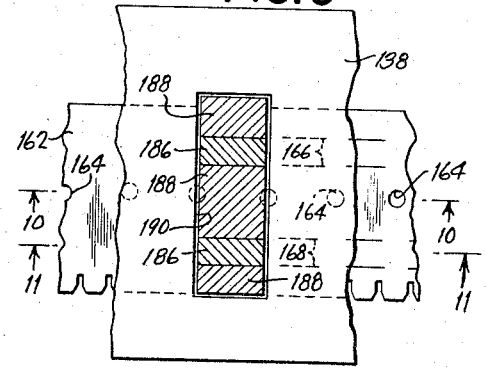
FIG. 9
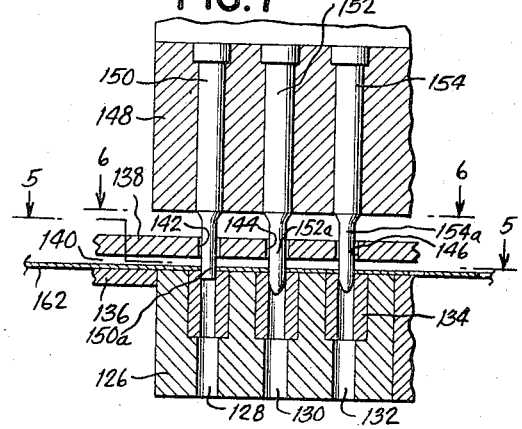
FIG. 7
FIG. 7A
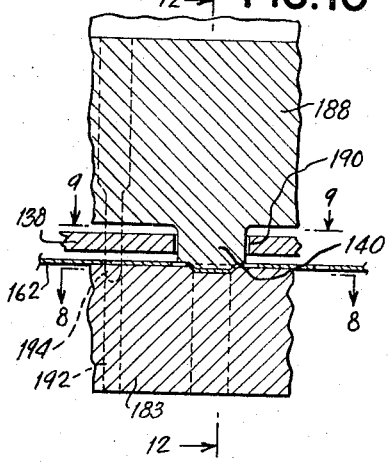
FIG. 10
INVENTOR.
FELIX S. WEISS
BY W. D. Keith,
ATTORNEY April 25, 1967 F. S. WEISS 3,315,331
APPARATUS FOR MANUFACTURING CAPACITORS
Original Filed June 15, 1961 21 Sheets-Sheet 6

INVENTOR.
FELIX S. WEISS
BY W. D. Keith
ATTORNEY

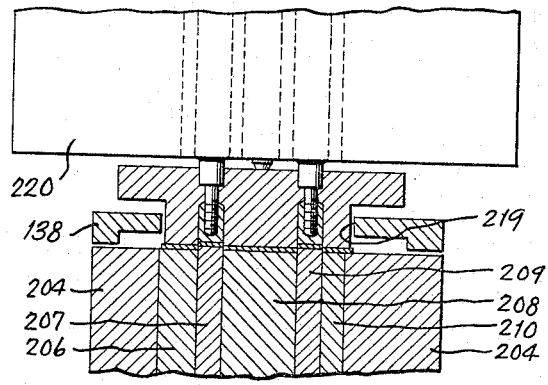
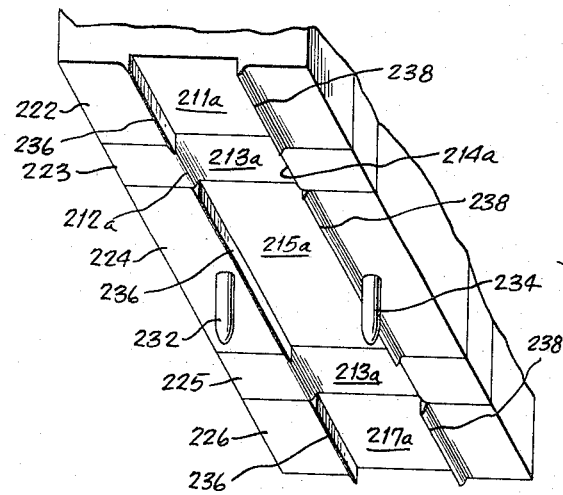
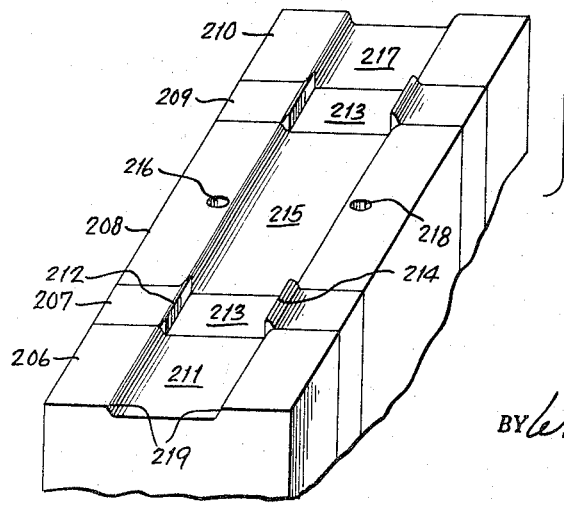

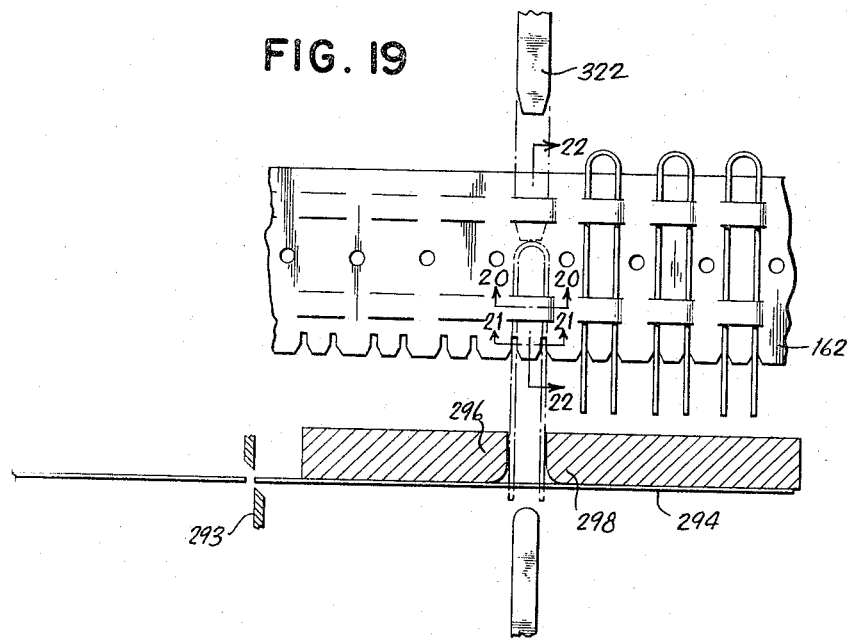
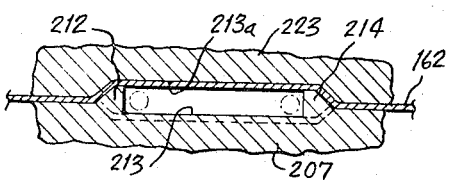
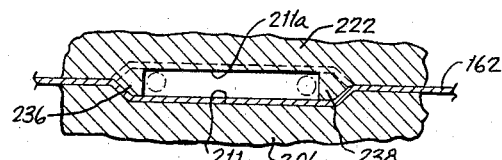
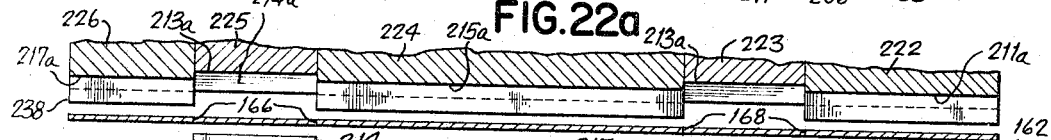

April 25, 1967 F. S. WEISS 3,315,331
APPARATUS FOR MANUFACTURING CAPACITORS
Original Filed June 15, 1961 21 Sheets-Sheet 10

INVENTOR.
FELIX S. WEISS
BY W. D. Keith,

ATTORNEY

INVENTOR.
FELIX S. WEISS
BY W. D. Keith,
ATTORNEY

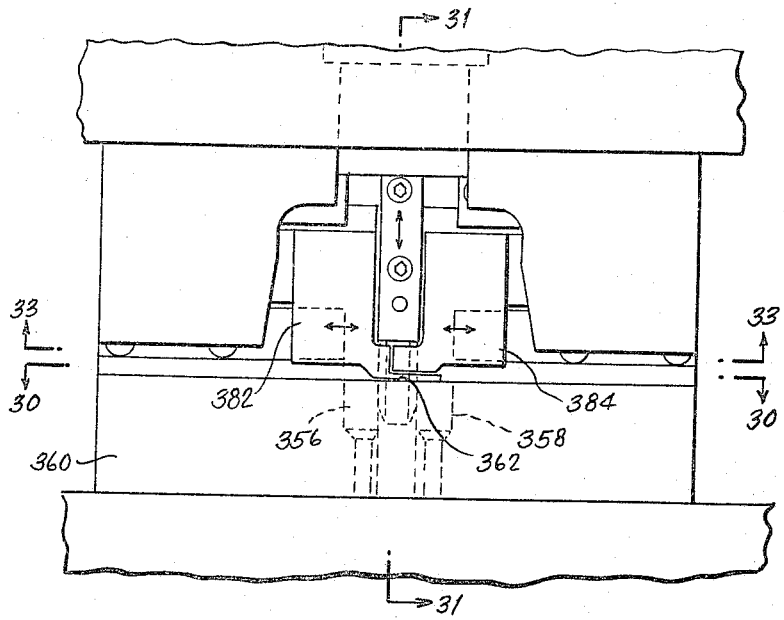
FIG. 29.
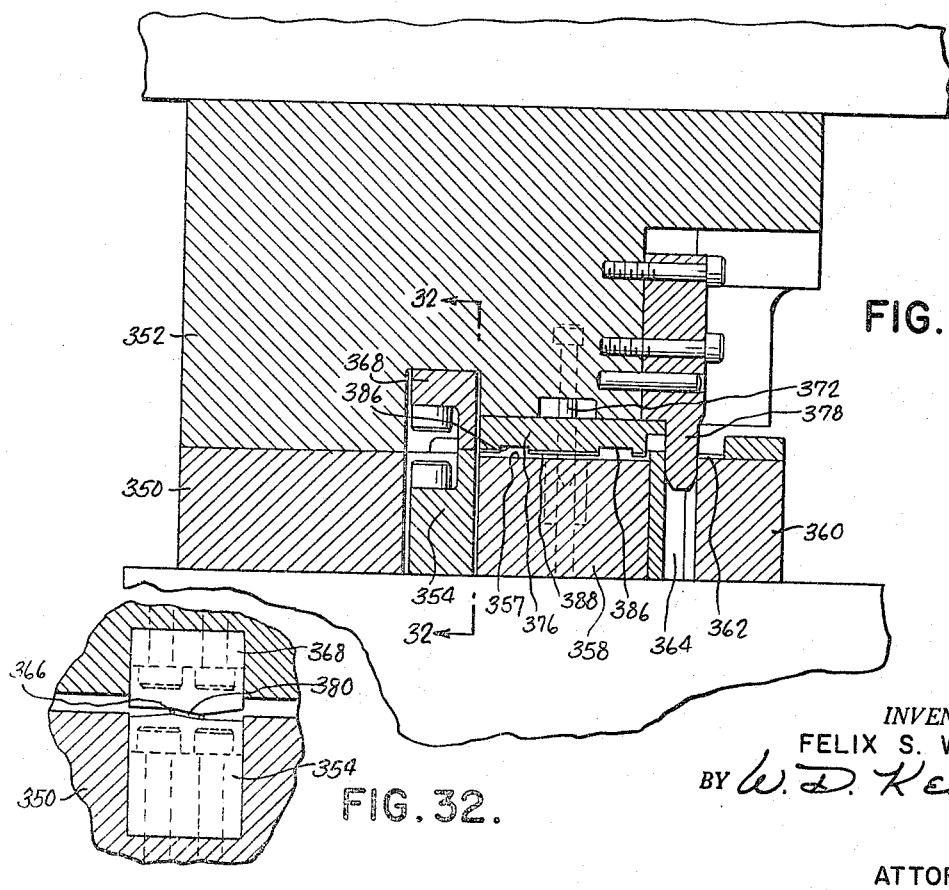
FIG. 31.
FIG. 32.
INVENTOR.
FELIX S. WEISS
BY W. D. Keith,
ATTORNEY INVENTOR.
FELIX S. WEISS
BY W. D. Keith
ATTORNEY INVENTOR.
FELIX S. WEISS
BY W. D. Keith,
ATTORNEY

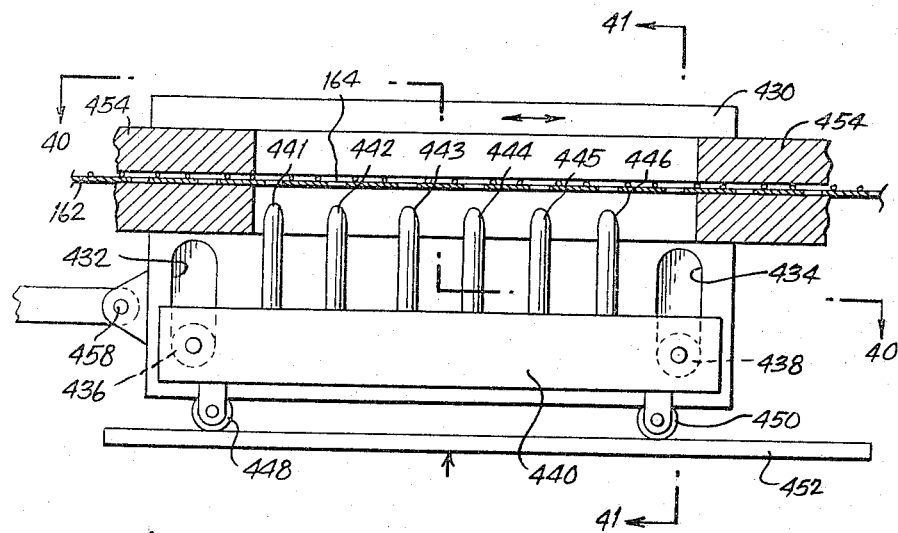

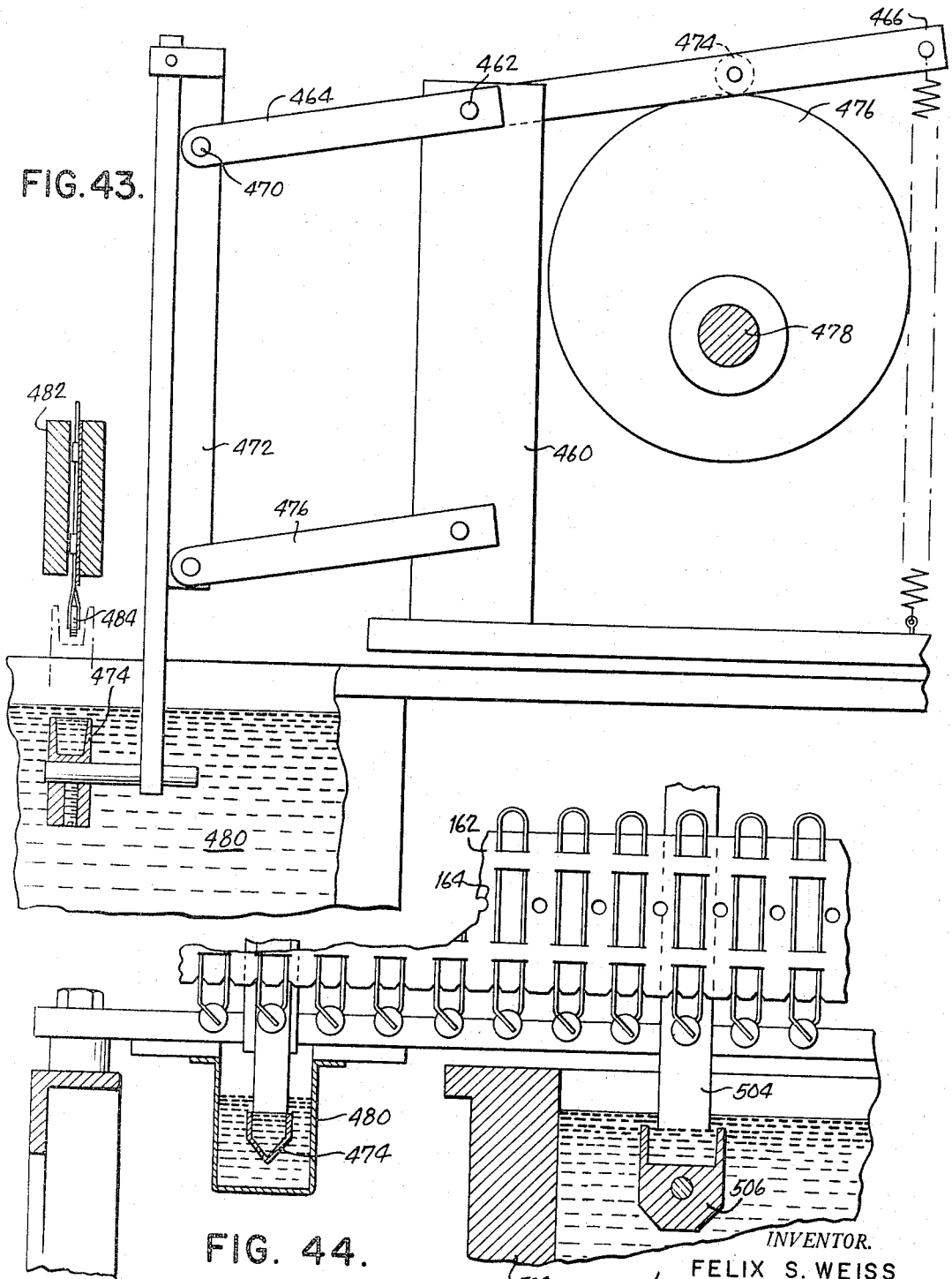

April 25, 1967  F. S. WEISS  3,315,331
APPARATUS FOR MANUFACTURING CAPACITORS
Original Filed June 15, 1961  21 Sheets-Sheet 18
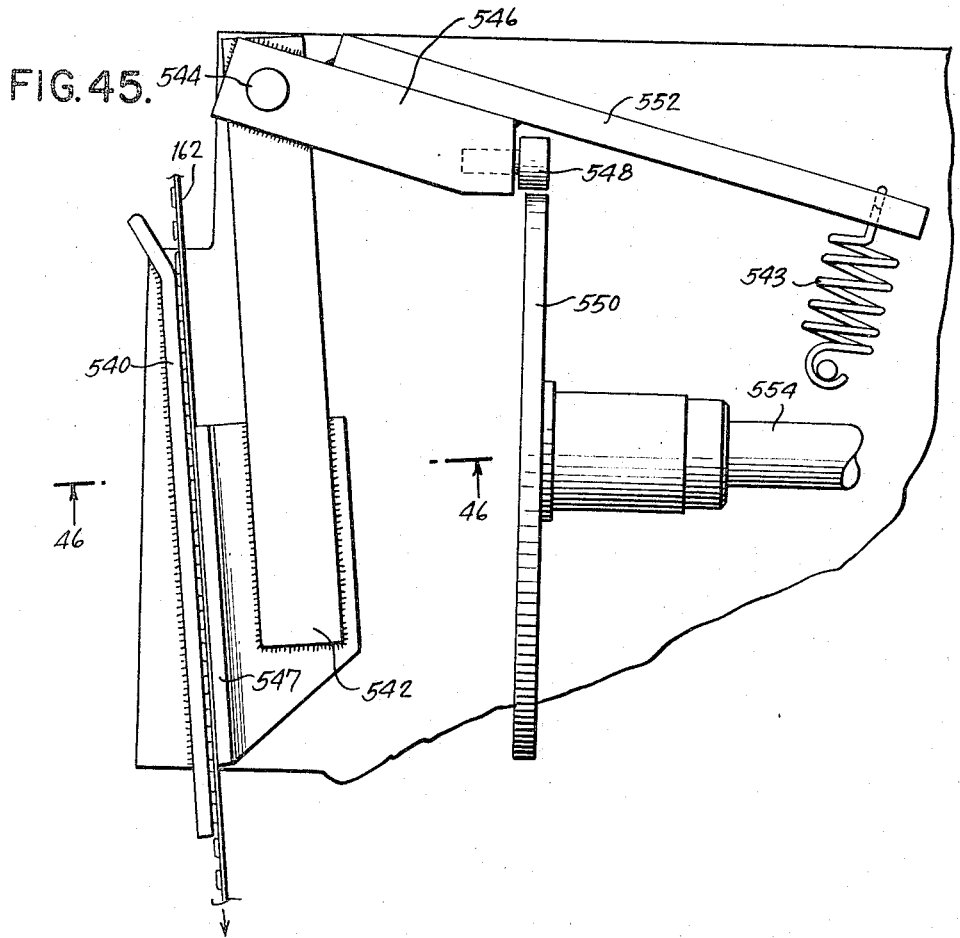
FIG. 45.
FIG. 46.
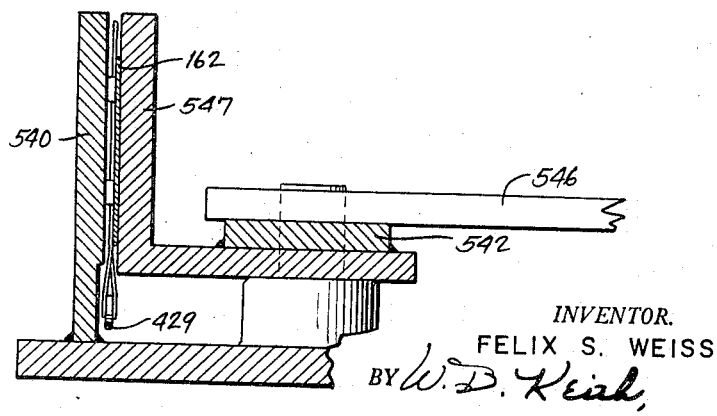
INVENTOR.
FELIX S. WEISS
BY W. D. Keith
ATTORNEY

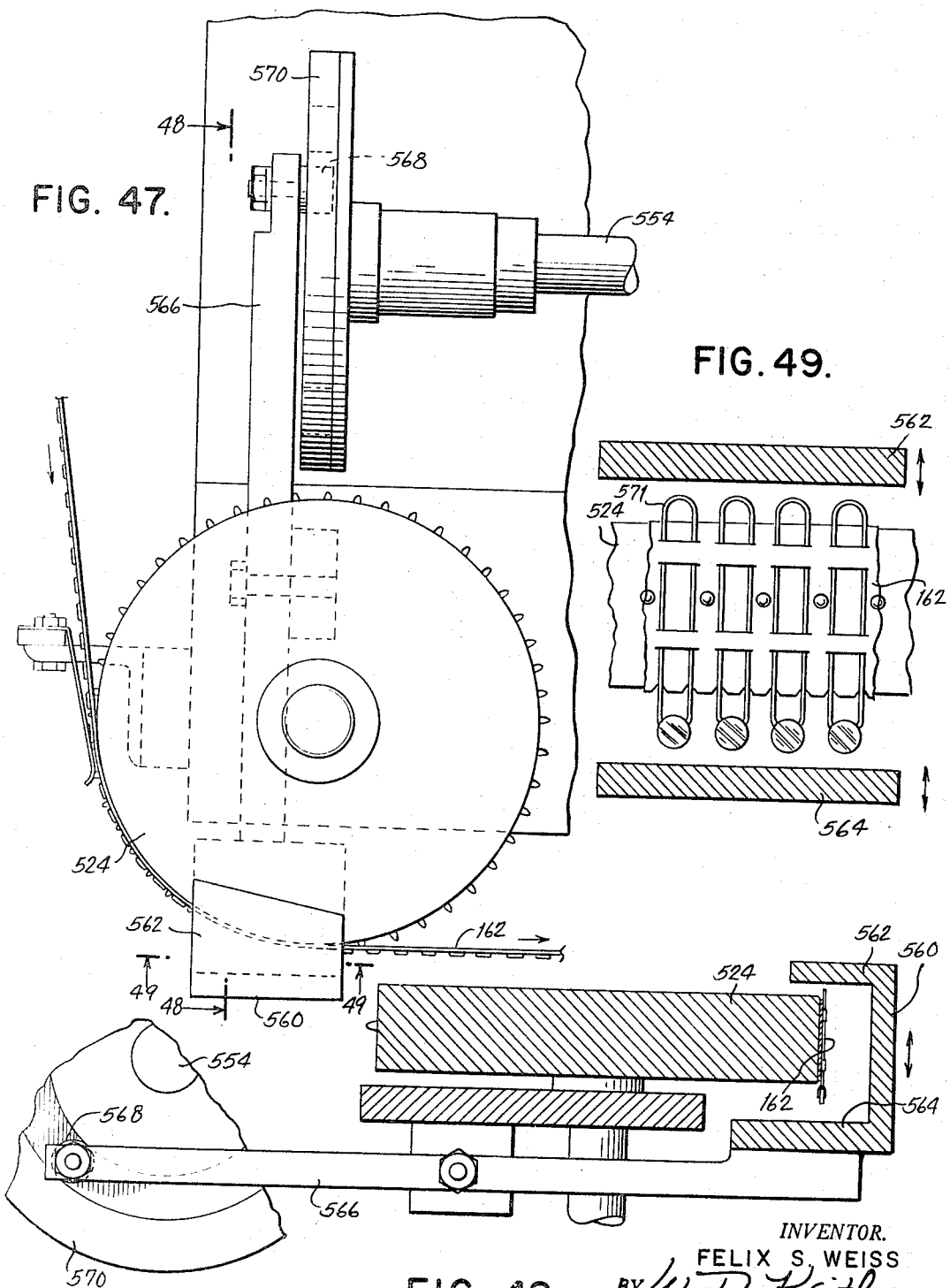

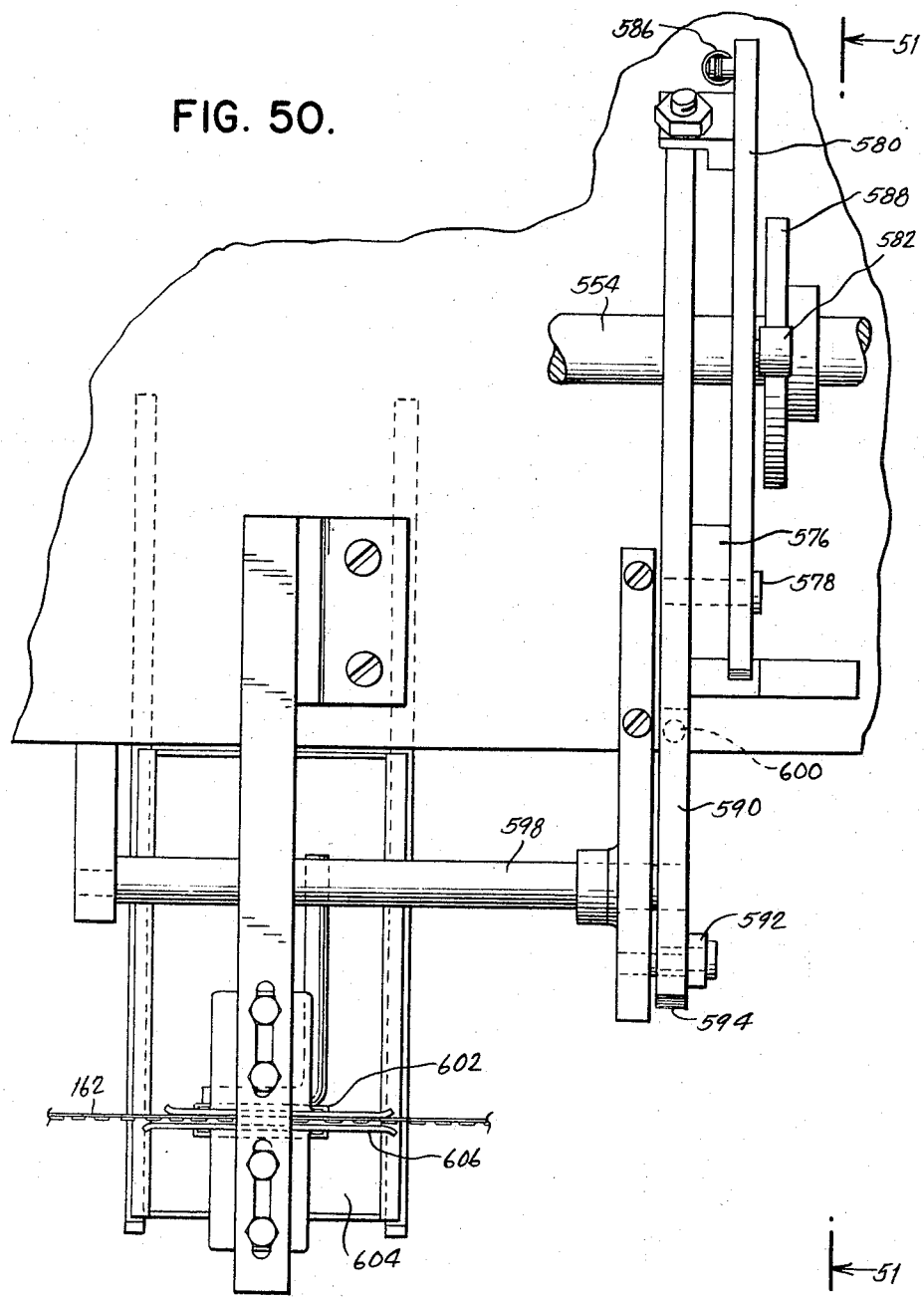

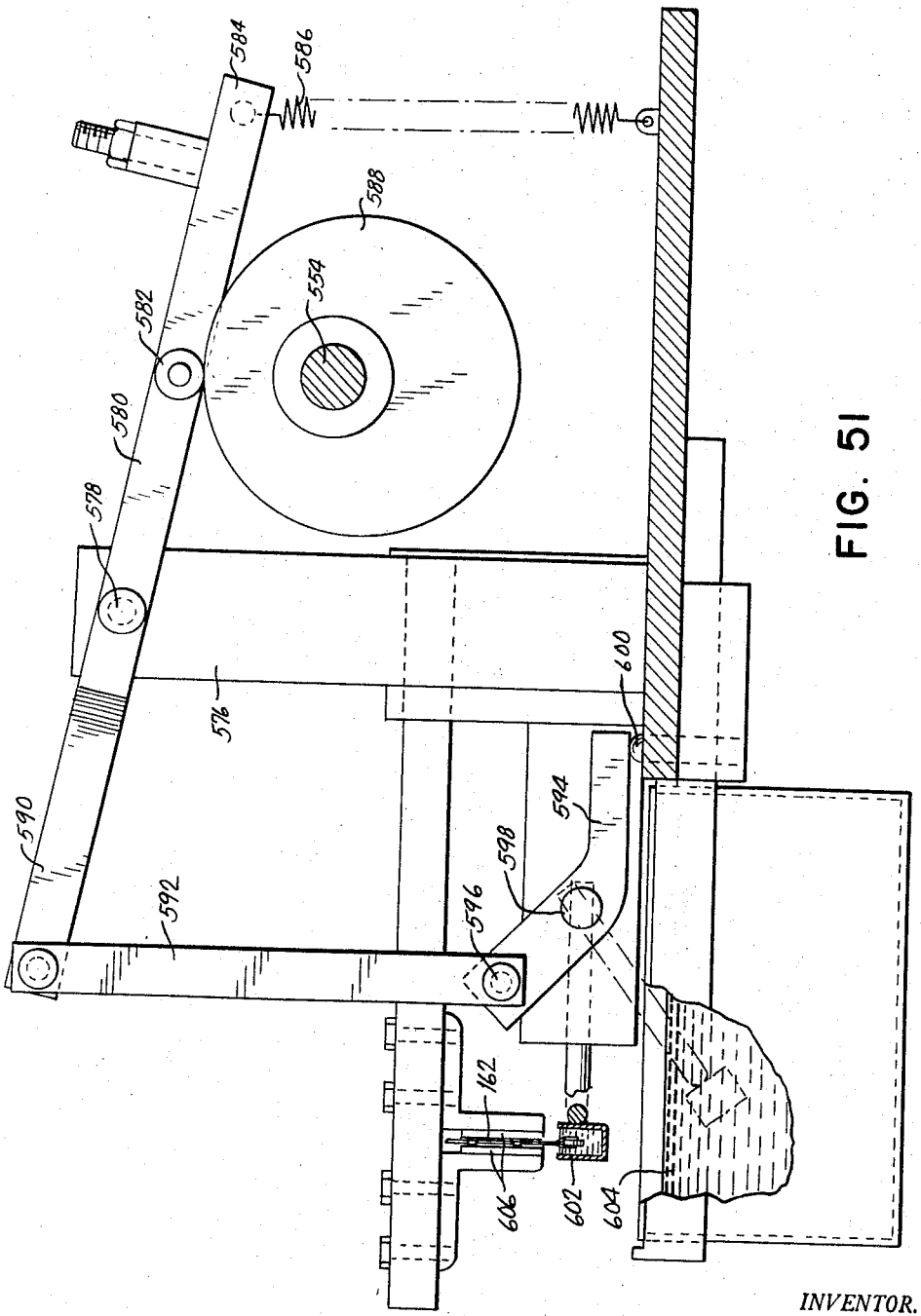

United States Patent Office 3,315,331
Patented Apr. 25, 1967

3,315,331
APPARATUS FOR MANUFACTURING CAPACITORS
Felix S. Weiss, Lake Success, N.Y., assignor to Cornell-Dubilier Electric Corporation, a corporation of Delaware
Continuation of application Ser. No. 120,869, June 15, 1961. This application June 16, 1964, Ser. No. 375,604
5 Claims. (Cl. 29—25.42)

This application is a continuation of my application Ser. No. 120,869, filed June 15, 1961 (now abandoned), and the latter application was a continuation-in-part of my application Ser. No. 579,679, filed Apr. 20, 1956, now abandoned. Other continuations and continuations-in-part of said application Ser. No. 579,679 are Patents Nos. 3,079,957, issued Mar. 5, 1963; 3,080,908, issued Mar. 12, 1963; 3,091,835, issued June 4, 1963; and 3,168,885, issued Feb. 9, 1965. Further, my Patent No. 3,231,082, issued January 25, 1966, is a division of Ser. No. 799,200, filed Mar. 13, 1959 (now abandoned), which was a division of my aforementioned application Ser. No. 579,679.

This invention relates to the manufacture of capacitors and particularly to an improved method and apparatus for the continuous and automatic manufacture of ceramic disc capacitors and like articles.

Recent years have witnessed an expanding field of use for ceramic capacitors of the so-called disc type, due in part to their relatively small size and in part to their ready adaptability, when properly arranged, for use in conjunction with automatic assembly machinery for installation purposes.

Ceramic disc capacitors of the type with which we are herein particularly concerned include a relatively small ceramic dielectric disc having a layer of conducting material disposed on each of the opposite faces thereof, and serving as the electrode elements for the capacitor unit. Secured to each of said layers of conducting material is a suitable terminal or lead wire, and the entire assembly, save for the extending portion of the terminal wires, is covered with a coating of suitable insulating material. Conventional fabrication procedures for the manufacture of such capacitors have been almost, if not entirely, discontinuous in nature involving relatively delicate, tedious and time consuming hand operations which have limited production and have contributed materially to the costs of the finished product. Efforts have been made to overcome the above problems by the utilization of machines or machine-like adjuncts facilitating batch handling of sub-assemblies, however, in all such instances production has been limited by the necessity of performing manual operations on the individual capacitor subassemblies at one or more points during the fabrication procedure. In light thereof, quantity manufacture of such small sized units by present day methods is relatively slow, costly and difficult, due in part to required manual fabrication steps which result in excessive labor costs and production limitations and in part to the necessary precautions required for maintenance of physical and electrical uniformity of the finished units.

The herein disclosed subject matter is intended to be illustrative of my improved manufacturing method and apparatus and the specifically illustrated embodiment may be briefly described as a novel and improved construction for a ceramic disc capacitor fabricating machine embodying the subject method and in which an elongate continuous strip of dispensable material serves, in addition to a packaging mount for the finished products, as an advanceable web conveyor to continuously position, transfer, introduce and remove capacitor constituent elements and progressively formed subassemblies thereof relative to a plurality of sequentially arranged, cyclically operable and adjacently positioned operating stations in which the sequential fabricating steps are concurrently and sequentially effected on the conveyor strip supported workpieces. Included therein are means for preparing the dispensable strip conveyor to serve as the carrier for the progressively formed workpieces and means for effecting the progressive fabrication of the capacitors which include, in sequence, progressive formation of capacitor subassemblies on the carrier strip from capacitor unit constituent elements, fluxing, soldering, degreasing, insulation coating, drying, testing, counting and code identification.

Among the advantages attendant the instant invention are an appreciable reduction in manufacturing costs effected through labor savings and increases in production rates and the production of clearly identified finished units of uniform quality and of a character that facilitates the utilization of automatic assembly machinery and permits continuous inventory and usage control in the hands of the ultimate user. In addition thereto the progressive fabrication of subassemblies, while the same are securely maintained in predetermined positional relationship on the conveyor, prevents undesired deformation of easily deforamble constituent elements such as lead wires and the like.

The object of this invention is the provision of an improved method and apparatus for the automatic fabrication of ceramic disc capacitors and like articles.

A further object of this invention is the provision of an improved manufacturing method for ceramic disc capacitors that facilitates production planning and organization as well as permitting reduction in manufacturing costs and increases in production rates.

Other objects and advantages of the invention will be pointed out in the following disclosure and claims and will be apparent from the accompanying drawings, which disclose, by way of example, the principles underlying the invention and the presently preferred apparatus by which said principles may be usefully employed in the production of finished units that enjoy most, if not all, of the advantages flowing from this invention.

Referring to the drawings:

FIGURE 3 is a more detailed schematic flow diagram indicative of the essential and preferred operations necessary to the further processing of the soldered ceramic disc subassemblies in the formation of the finished units, FIGURES 2 and 3 when taken together being indicative of a complete processing sequence;

FIGURE 5 is a sectional view on the line 5—5 of FIGURE 7;

FIGURE 6 is a sectional view on the line 6—6 of FIGURE 7;

FIGURE 7 is a section taken on the line 7—7 of FIGURE 5;

FIGURE 7a is a section taken on the line 7a of FIGURE 6;

FIGURE 8 is a section on the line 8—8 of FIGURE 10;
FIGURE 9 is a section on the line 9—9 of FIGURE 10;

Figure 11:
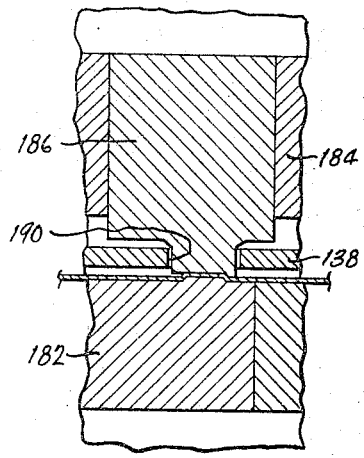
Figure 12:
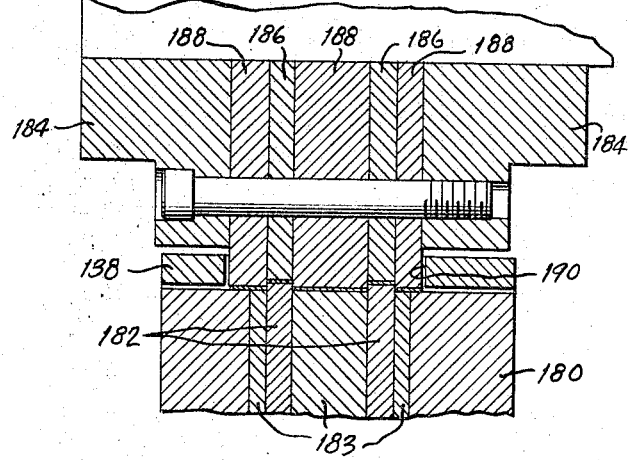
Figure 13:
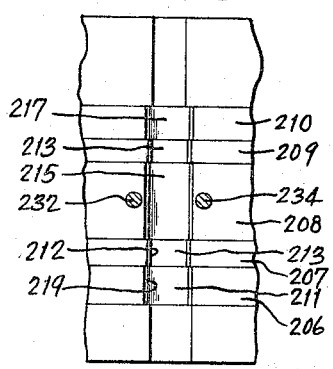
Figure 14:
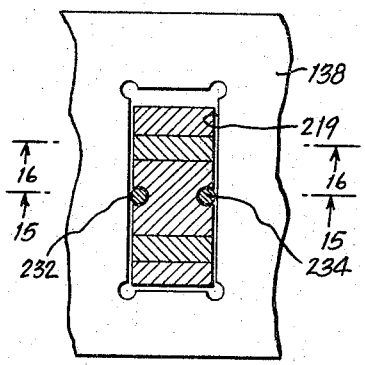
Figure 15:
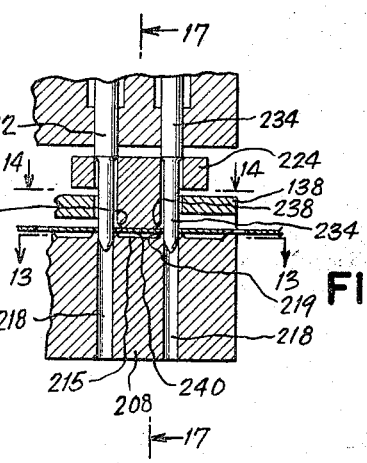
Figure 16:
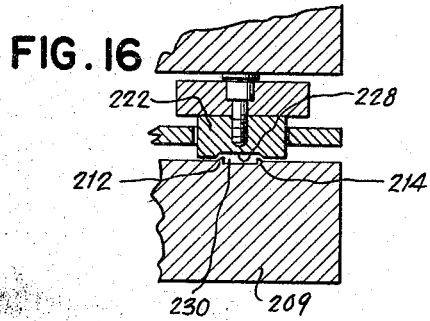
Figure 23:
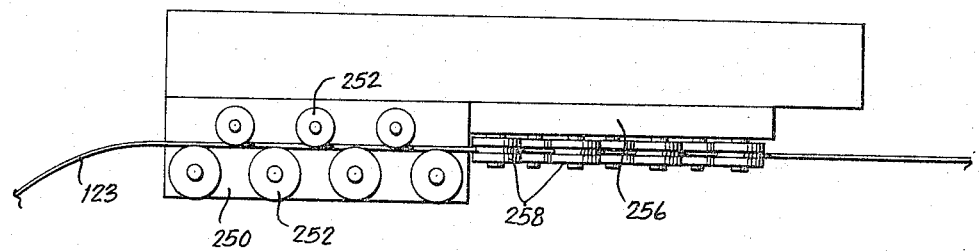
Figure 24:
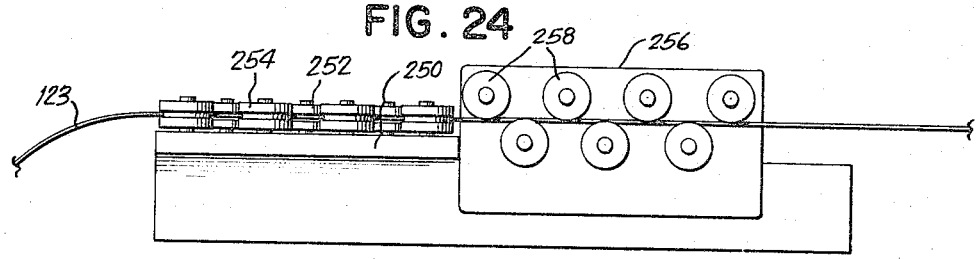
Figure 25:
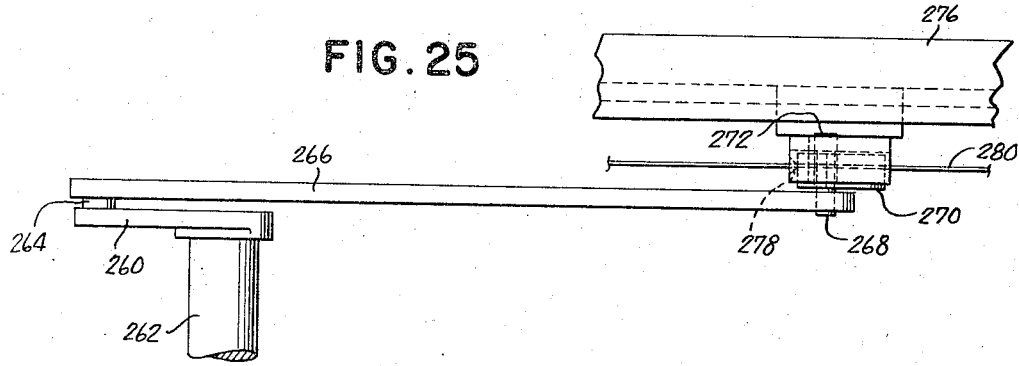
Figure 26:
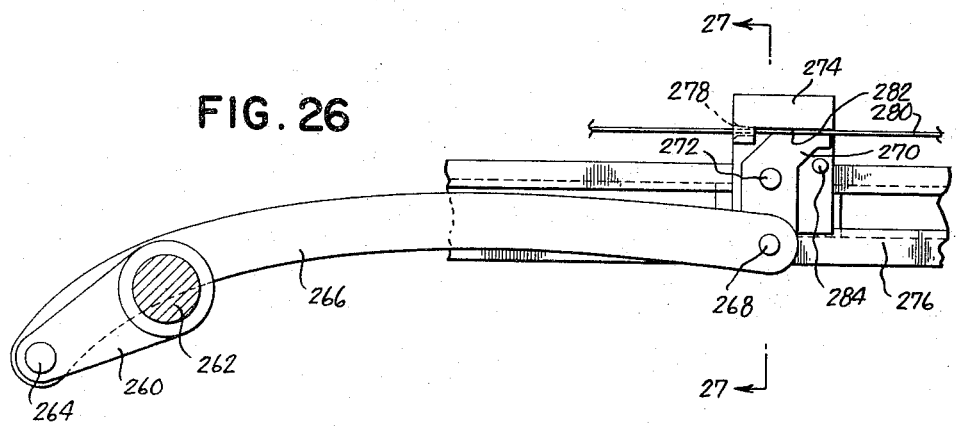
Figure 27:
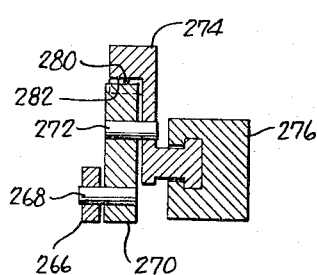
Figure 28:
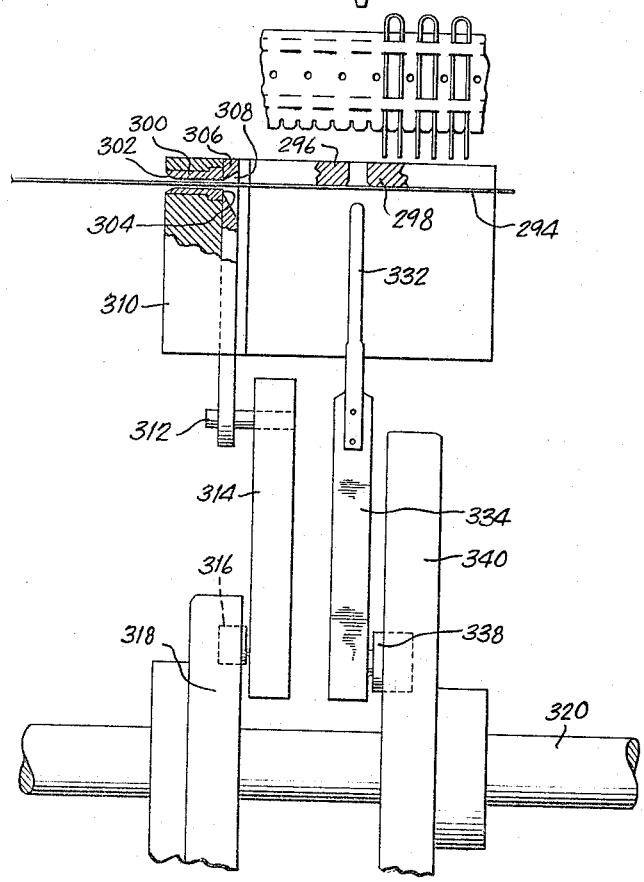
Figure 30:
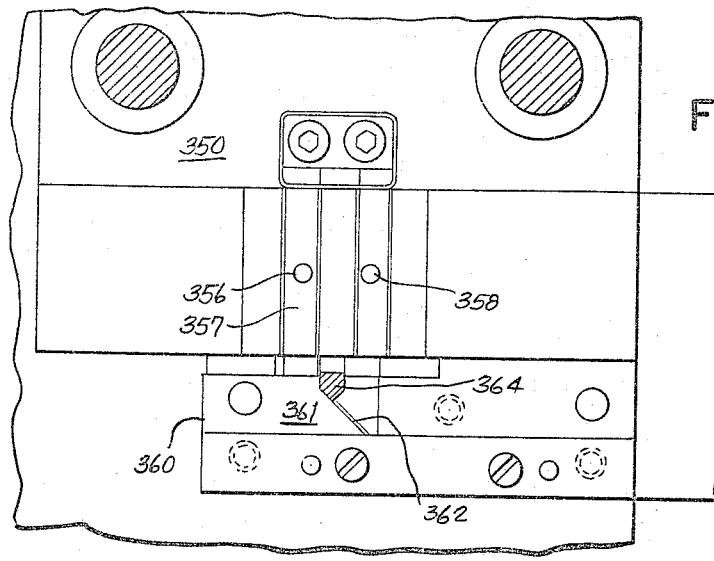
Figure 33:
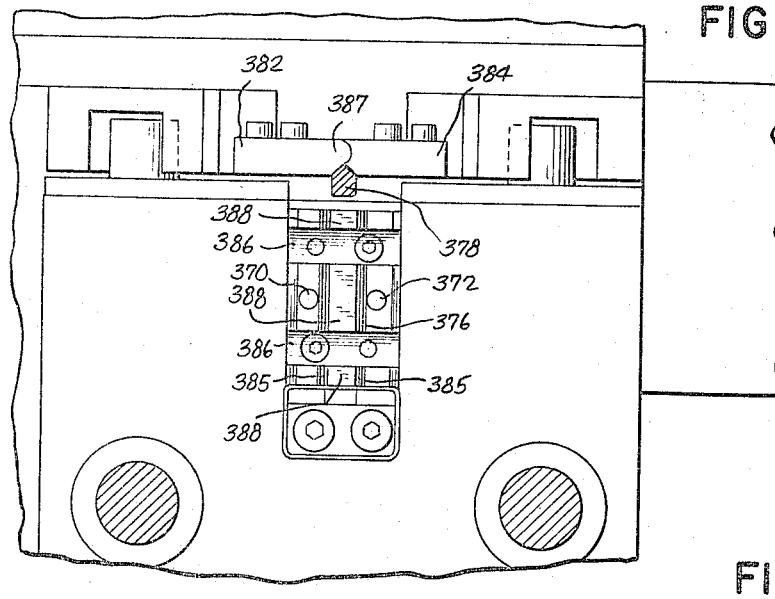
Figure 34:
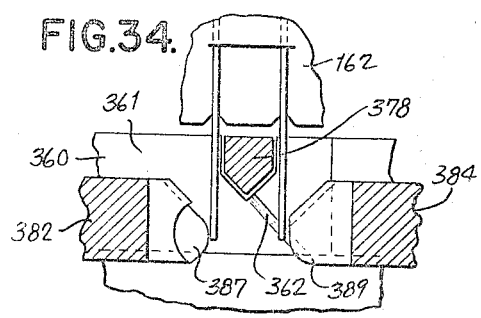
Figure 35:
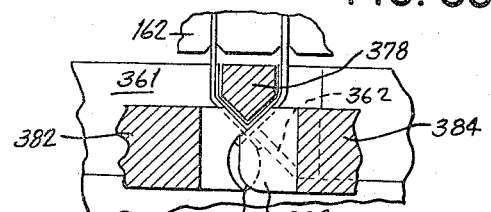
Figure 36:
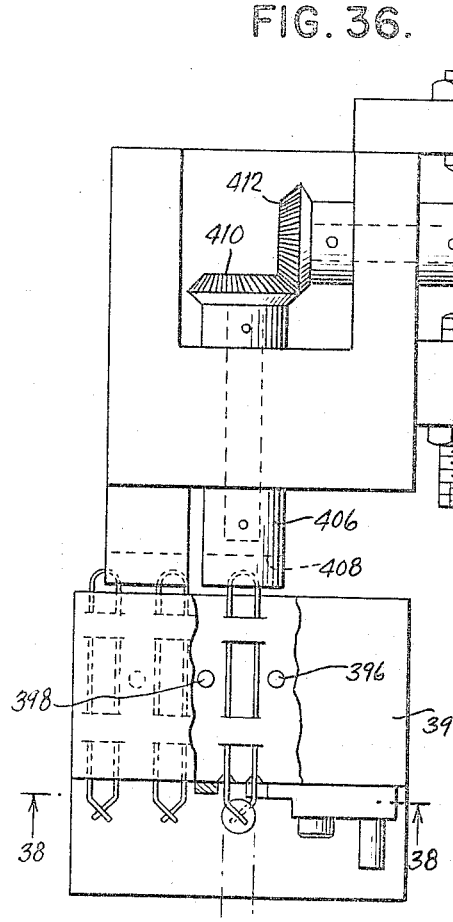
Figure 38:
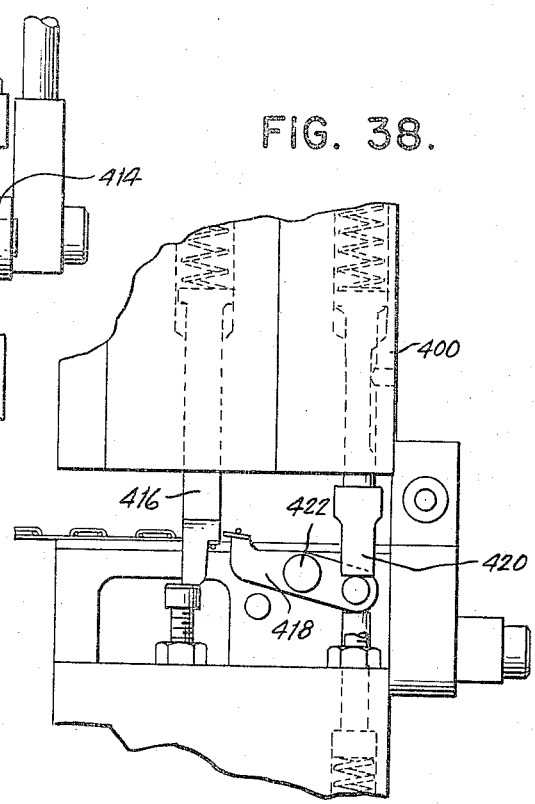
Figure 37:
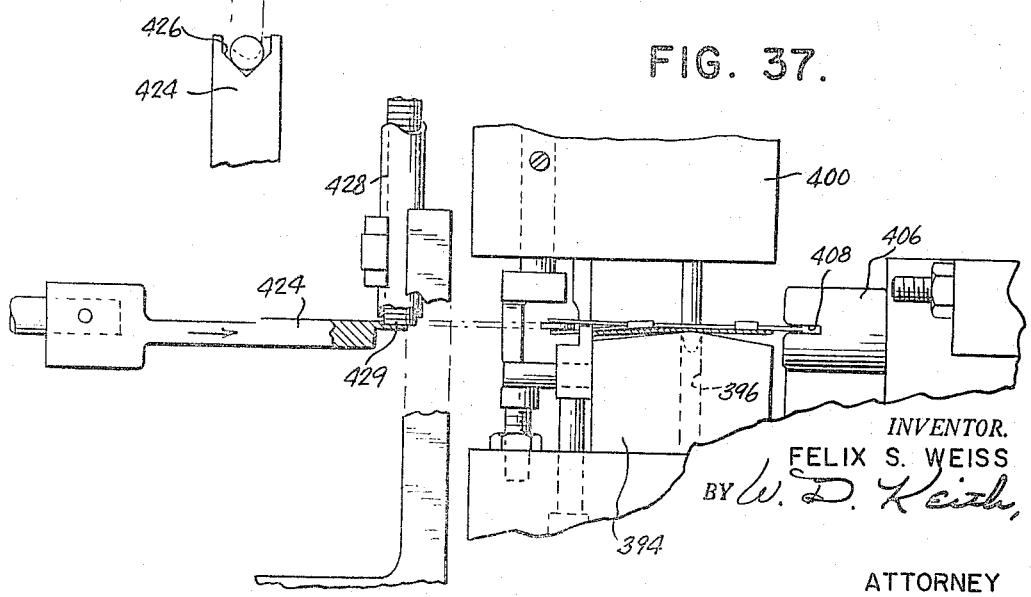
Figure 42:
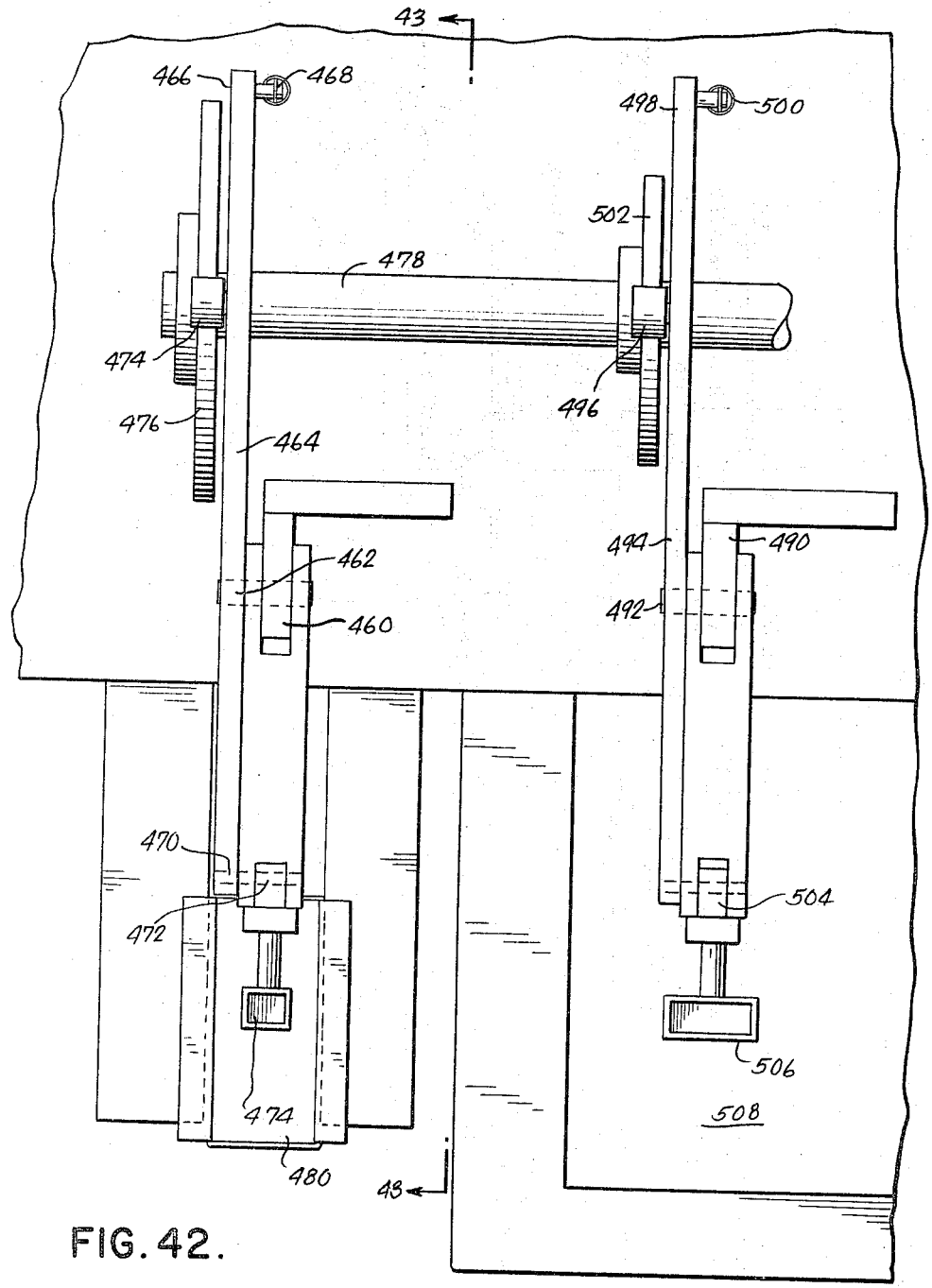

FIGURE 10 is a section on the line 10—10 of FIGURE 9;
FIGURE 11 is a section on the line 11—11 of FIGURE 9;
FIGURE 12 is a section on the line 12—12 of FIGURE 10;
FIGURE 13 is a section on the line 13—13 of FIGURE 15;
FIGURE 14 is a section on the line 14—14 of FIGURE 15;
FIGURE 15 is a section on the line 15—15 of FIGURE 14;
FIGURE 16 is a section on the line 16—16 of FIGURE 14;
FIGURE 17 is a section on the line 17—17 of FIGURE 15;
FIGURE 18 is an oblique view showing the die and punch surface configurations of certain of the web manipulating components included in the wire insertion station;
FIGURE 19 is a schematic plan view representative of operations effected at the terminal wire insertion station;
FIGURE 20 is a section on the line 20—20 of FIGURE 19;
FIGURE 21 is a section on the line 21—21 of FIGURE 19;
FIGURE 22a is a section on the line 22—22 of FIGURE 19 immediately prior to web deformation;
FIGURE 22b is a section on the line 22—22 of FIGURE 19 subsequent to web deformation and prior to terminal wire subassembly insertion;
FIGURE 23 is a plan view of the terminal wire straightening unit;
FIGURE 24 is a side elevational view of the terminal wire straightening unit;
FIGURE 25 is a schematic plan view of the presently preferred elements included in the terminal wire feed station;
FIGURE 26 is a side elevational view of the components illustrated in FIGURE 25;
FIGURE 27 is a section on the line 27—27 of FIGURE 26;
FIGURE 28 is a schematic plan view of the presently preferred terminal wire forming and insertion elements included in the terminal wire insertion station;
FIGURE 29 is a front elevational view, partially in section, of the presently preferred terminal wire end forming elements includable in the terminal wire subassembly end forming station D;
FIGURE 30 is a section on the line 30—30 of FIGURE 29;
FIGURE 31 is a section on the line 31—31 of FIGURE 29;
FIGURE 32 is a section on the line 32—32 of FIGURE 31;
FIGURE 33 is a section on the line 33—33 of FIGURE 29;
FIGURE 34 is an enlarged plan view of the deforming slides in separated position;
FIGURE 35 is an enlarged plan view of the deforming slides in closed position;
FIGURE 36 is a plan view of the essentials of the presently preferred mechanical elements includable in the ceramic disc insertion station;
FIGURE 37 is a side elevational view of the components illustrated in FIGURE 36;
FIGURE 38 is a section taken on the line 38—38 of FIGURE 36;
FIGURE 39 is a side elevation, partly in section, of the essentials of the presently preferred mechanical elements includable in the web drive indexing station;
FIGURE 40 is a section on the line 40—40 of FIGURE 39;
FIGURE 41 is a section on the line 41—41 of FIGURE 40;
FIGURE 42 is a plan view of the essentials of the presently preferred mechanical elements includable in the flux and solder dip stations;
FIGURE 43 is a side elevational view of certain of the components illustrated in FIGURE 42 as viewed from the line 43—43 thereon;
FIGURE 44 is an enlarged and fragmentary front elevational view of certain of the elements illustrated in FIGURES 42 and 43;
FIGURE 45 is a plan view of the essentials of the presently preferred mechanical elements includable in the terminal straightening station;
FIGURE 46 is a section on the line 46—46 of FIGURE 45;
FIGURE 47 is a plan view of the essentials of the presently preferred mechanical elements includable in the subassembly positioning station;
FIGURE 48 is a section on the line 48—48 of FIGURE 47;
FIGURE 49 is a section on the line 49—49 of FIGURE 47;
FIGURE 50 is a plan view of the essentials of the presently preferred mechanical elements includable in the insulation dip station;
FIGURE 51 is a section on the line 51—51 of FIGURE 50.

Figure 1:
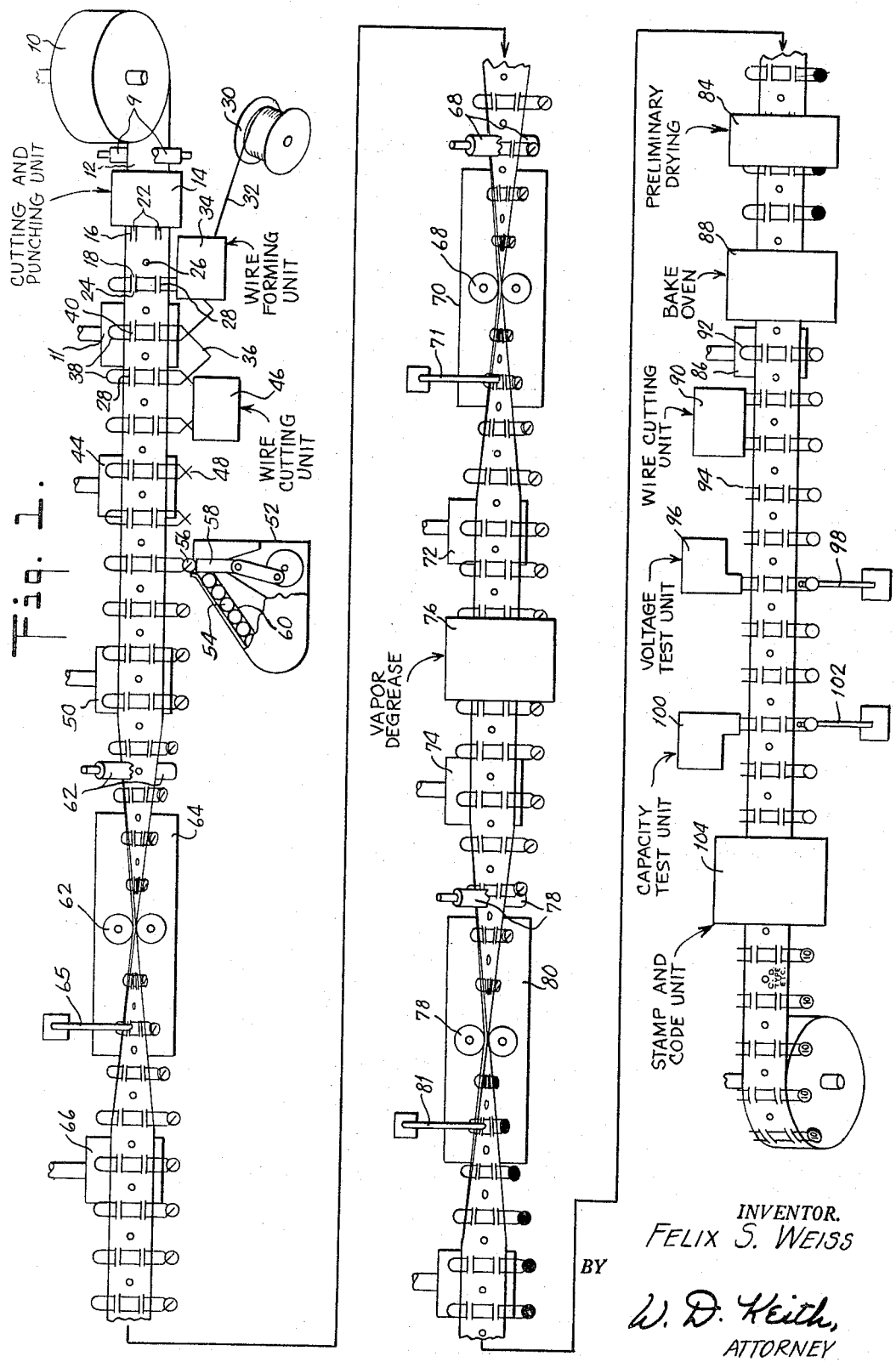
FIGURE 1 is a schematic flow diagram generally illustrative of the fabrication steps employable in the practice of the invention.

The complete procedure shown in FIGURE 1 is intended to generally cover the entire sequence of operations from initial raw material treatment to the ultimate production of a package mount of finished capacitor units except for the possible omission of certain minor steps which have no outstanding relation to the invention and which will be fully understood by persons skilled in the art. It will be appreciated that many of the elements of apparatus appearing in the drawings are schematic in nature, in that for the most part they are intended to afford a recognizable indication of apparatus suitable for the type of operation at various stages, rather than to restrict the system to the details of any particular device which might be employed to perform such operation.

By way of general introduction, the complete procedure may include the step of preparing a dispensable strip or web of conveyor material to receive a prepared terminal wire assembly, preparing and inserting the terminal wire assembly into the previously prepared strip material, inserting the previously prepared capacitor units into the prepared terminal assemblies mounted on the strip conveyor to form a capacitor subassembly, and then progressively treating the above described subassembly to form the finished capacitor unit as by soldering the terminal leads to the conducting surfaces of the capacitor unit, and suitable insulation and drying steps. Notably important aspects of the present invention reside in the discovery that the improvement and simplification of the entire procedure may be realized by utilizing a dispensable strip conveyor as a carrier to continuously position, transfer, introduce and remove the constituent elements and progressively fabricated subassemblies during the passage thereof through the sequentially arranged operating stations and as the ultimate packaging mount as well as by taking advantage of certain interrelationships between the several steps, such as shown and such as more fully described below.

Referring to FIGURE 1 of the drawings by way of general introduction, there is provided a reel 10 of dispensable or expendable strip or web material 12 such as relatively thick paper such as that used in file folders or tabulating cards, or relatively thin cardboard or the like, of such width to serve as a packaging mount for, and to accommodate the size of finished capacitors being fabricated. The strip material 12 should be of such mechanical strength and flexibility to serve as a carrier or conveyor for the constituent elements of the capacitor assembly during the sequential fabrication operations to be described.

The conveyor strip material 12 is unwound from the reel 10 by the driven pressure rollers 9 and is pulled as, for example, by the sprocketed driving rollers 11, through a cutting and punching unit 14 operated in synchronism with the rate of conveyor strip advance. In the illustrated embodiment the cutting and punching unit 14 is adapted to cut the conveyor strip material 12 with two pairs of slits 22 at predetermined uniformly spaced locations such as indicated at 16 and 18, and to punch suitably located drive sprocket tooth engaging apertures 26 therein. In addition thereto, the unit 14 is adapted to emboss or raise the portions 24 of the strip material disposed intermediate the slits therein upwardly from the plane of the remainder of the strip 12 to form article apertures 28 therein. The particular dimensions of the slits and raised portions are chosen to provide an aperture that accommodates the size and shape of the particular article to be inserted therein. A suitable cutting and punching unit 14 may include, by way of example, a fixed die plate having a plurality of shaped cutting blades and a punch wheel mounted on a rotatable shaft positioned thereabove and in cooperative relation therewith to provide for the repeated slitting and punching of the strip material 12 as it passes through the unit in association with displacing rollers to displace the slit portions upwardly from the plane of the strip conveyor in the manner described above.

In the illustrated embodiment there is also provided a second roll 30 of suitable terminal wire 32. The terminal wire 32 is unwound from the roll 30 and is introduced into a wire forming unit 34 which serves to deform the wire into a terminal wire subassembly as indicated at 36, with the folded portions 38 thereof being spaced apart a predetermined distance so as to permit insertion thereof into successive apertures 28 formed by the raised portions 24 and the surface of the strip material as illustrated at 40. The wire forming unit 34 also may include components which serve to insert the folded wires into each of the apertures in the conveyor strip 12 or such may be done by a separate operation. In any event, however, the conveyor strip material is advanced past a so-called filling station wherein the terminal wire subassembly, in this instance, is inserted into the apertures 28 so that the inserted article is gripped underneath the two bridge-like portions formed by the embossing and is held securely thereby on the conveyor. In conjunction with the insertion of the terminal wire subassembly, abutments such as 42 may be provided to properly locate the terminal subassemblies in the aperture 28 to assure uniform disposition thereof relative to the strip conveyor 12.

After insertion of the terminal subassemblies in the conveyor strip 12, the conveyor is advanced by suitable driving means as the sprocketed driving rollers 44 through a terminal wire cutting unit 46 which severs the protruding end portions of the folded terminal wire so as to provide successive exposed pairs of crossed ends 48. After the terminal subassembly has been treated to provide the crossed ends 48, the conveyor strip 12 and the terminal wire subassemblies mounted thereon as now constituted are advanced by the sprocketed driving rollers 50 through a ceramic capacitor disc feeding unit schematically illustrated at 52. Here, previously prepared capacitor units such as metalized ceramic discs 54 are successively introduced intermediate the crossed ends 48 of the terminal wires as at 56. The insertion of the metalized ceramic discs 54 may be effected by the action of a cyclically operable ram 58 operating in synchronism with the advancing conveyor strip 12 on the lead disc contained in a feed through 60. The spring action of the crossed ends 48 of the terminal wires resulting from the biasing thereof effected by the forming operation will normally be sufficient to hold the capacitor unit such as the metalized ceramic disc 54 in position as the strip material 12 moves on to the next operation carrying the capacitor subassemblies as now constituted.

After ceramic disc insertion, the conveyor strip 12 is then advanced over a plurality of suitably positioned sprocketed and driven guide rollers 62 in such a manner that the successive ceramic discs 54 positioned intermediate the crossed terminal wire ends 48 as the capacitor subassemblies are now constituted are passed through a bath 64 containing suitable flux material. The flux bath 64 serves to prepare the metal covered or metalized surfaces of the ceramic discs 54 and the terminal wires for a subsequent solder operation. The dipping of the end portions of the subassemblies into the bath 64 is readily effected by shifting the plane of travel of the strip conveyor from horizontal to vertical as illustrated on the drawings. After progression of the units through the flux bath and removal therefrom, it is preferred to subject the conveyor strip to a light tapping action by a vibrator arm 65 so as to shake any excess of flux material from the previously treated unit.

After receiving a suitable flux treatment as described above, the conveyor strip 12 is returned to a horizontal plane, and is advanced by suitable driving means, such as the sprocketed driving rollers 66 over a second set of a plurality of suitably positioned sprocketed and driven guide rollers 68 in such a manner as to pass the flux treated ceramic discs 54 through a solder bath 70. The passage of the flux treated ceramic discs 54 through the solder bath 70 results in securing the ends of the terminal wires 48 both electrically and mechanically to the metal covered or metalized surfaces of the ceramic discs 54. As was the case subsequent to the flux dip as described above, the conveyor strip 12 is again subjected to a light tapping action, upon removal from the solder bath, by a vibrator arm 71 to shake any excess of solder from the finished units.

Following the passage of the ceramic discs through the solder bath 70, the conveyor strip 12 containing the capacitor subassemblies as now constituted is then preferably advanced by suitable driving means, such as the sprocketed drive rollers 72 and 74 through a vapor degreasing unit 76. The length of time during which the capacitor subassemblies must remain in the vapor degreasing unit 76 may be readily determined for any given set of operating conditions. The necessary "hang up" time may be afforded by causing the conveyor strip 12 to pass through the unit 76 in a relatively tortuous path which can be easily obtained by utilizing suitably positioned guide rollers therein to effect the same as for example causing the conveyor strip 12 to take a serpentine path therethrough.

Following the vapor degreasing treatment the conveyor strip 12 carrying the capacitor subassemblies as now constructed is advanced over a plurality of suitably positioned drive and guide rollers 78 which are positioned in usch a manner so as to cause the ceramic discs 54 with the terminal leads soldered thereto to pass through a bath 80 of insulating material. The passage of the ceramic discs through the insulating material bath 80 results in the application of a covering of insulating material entirely surrounding the exposed portions of the individual capacitor subassembly units mounted on the conveyor strip 12. Following the dipping of the units in the insulating bath 80, the strip conveyor 12 is again preferably subjected to a light tapping action by a vibrator arm 80 to shake any excess of insulating material off the treated units.

Subsequent to the insulation application operation the conveyor strip 12 is preferably advanced, as by a suitable sprocketed driving roller, through a preliminary drying unit 84 wherein preliminary drying of the insulated capacitor subassemblies is effected as by passing the conveyor strip 12 intermediate banks of infra-red lamps. Subsequent thereto the conveyor strip 12 may be advanced, as by a sprocketed drive roller 86 through a ake oven 88 for final drying. As was the case with he vapor degreasing unit 76, it may be necessary to rovide suitably positioned guide rollers within the bake ven 88 so as to provide for a relatively tortuous strip ath therethrough to maintain the strip and the capacitor ubassemblies supported thereon within the bake oven or a sufficient period of time to effect the desired degree of drying. It should be noted at this time that conveyor trip material 12 should be of such character to withstand the temperatures within the preliminary drying unit and the bake oven.

Subsequent to passage of the strip 12 through the bake oven 88 as described above, the conveyor strip 12 and he capacitor subassemblies as now constituted are advanced past a terminal wire cutting unit 90 which severs the extending ends 92 of the terminal wires as at 94. After passage through the wire cutting unit 90 the conveyor strip 12 is further advanced, and the severed ends are passed through a voltage testing unit 96 for a conventional voltage test. In the event a particular capacitor unit fails the voltage test, automatic means, such as a mechanical reject finger 98 electrically actuable in response to the voltage test, may be provided to remove the defective capacitor from the strip 12.

Subsequent to the voltage testing operation, as described above, the conveyor strip 12 is advanced, and the capacitors may next be subjected to a capacity test in their passage through a capacity test unit 100. In the event the capacity of the unit being tested does not fall within the required specifications, automatic means, such as a mechanical reject finger 102 electrically actuatable in response to the capacity test, may be provided to remove the defective capacitor from the conveyor strip 12. The voltage and capacity test units 96 and 100 also preferably include a punch for providing a suitably located aperture in the conveyor strip 12 whenever a defective unit is removed therefrom. This aperture permits a mechanical sensing operation to be effected whenever the finished units are used in automatic assembly machinery in order to assure continuous serial presentation of the finished units therein.

The conveyor strip 12 bearing the finished and tested capacitor units may then be passed through a suitable stamping and coding machine 104 which is adapted to count the number of finished units passing therethrough and to stamp a suitable code identification thereon together with a count index on the conveyor strip 12 which is representative of the number of finished capacitors contained in a given length of conveyor strip 12.

Following the above series of operations, the conveyor strip 12 may be wound into a roll which serves to protect the finished units from injury in handling or may be severed at any desired location therealong in accordance with the desires of the ultimate user. The roll or such severed portions are then packaged and wrapped for shipment using the conveyor strip 12 as the packaging mount for predetermined numbers of finished capacitors.

In instances wherein the length of strip material on the roll 10 corresponds to that of the finished package, for example, for bulk supply to retailers who may themselves cut off lengths in accordance with individual sales of small quantities, the conveyor strip 12 may be wound into a roll or folded into a stack, after which it may suffice in many instances merely to secure the end of the roll or the folds of the stack in place to secure the final package. Additional wrapping of course may be provided and the resulting package placed in boxes or crates for transport purposes.

It will be appreciated that the foregoing arrangement may be modified in a variety of ways within the scope of the invention. For example, the embossed slotting of the strip may be arranged in other ways to suit the shape of the individual articles, and there may be two (or more) rows of articles along the strip, if desired. Again, means other than sprocket wheels or projections on a belt may be utilized for driving the strip along the production line. Further, it is not essential to the invention that all the stages in the production and packaging process should take place in one continuous succession, and, if preferred, the strip may be taken off and wound into a roll at certain intermediate stage or stages in the process and subsequently fed from such roll for completion of the process.

Figure 2:
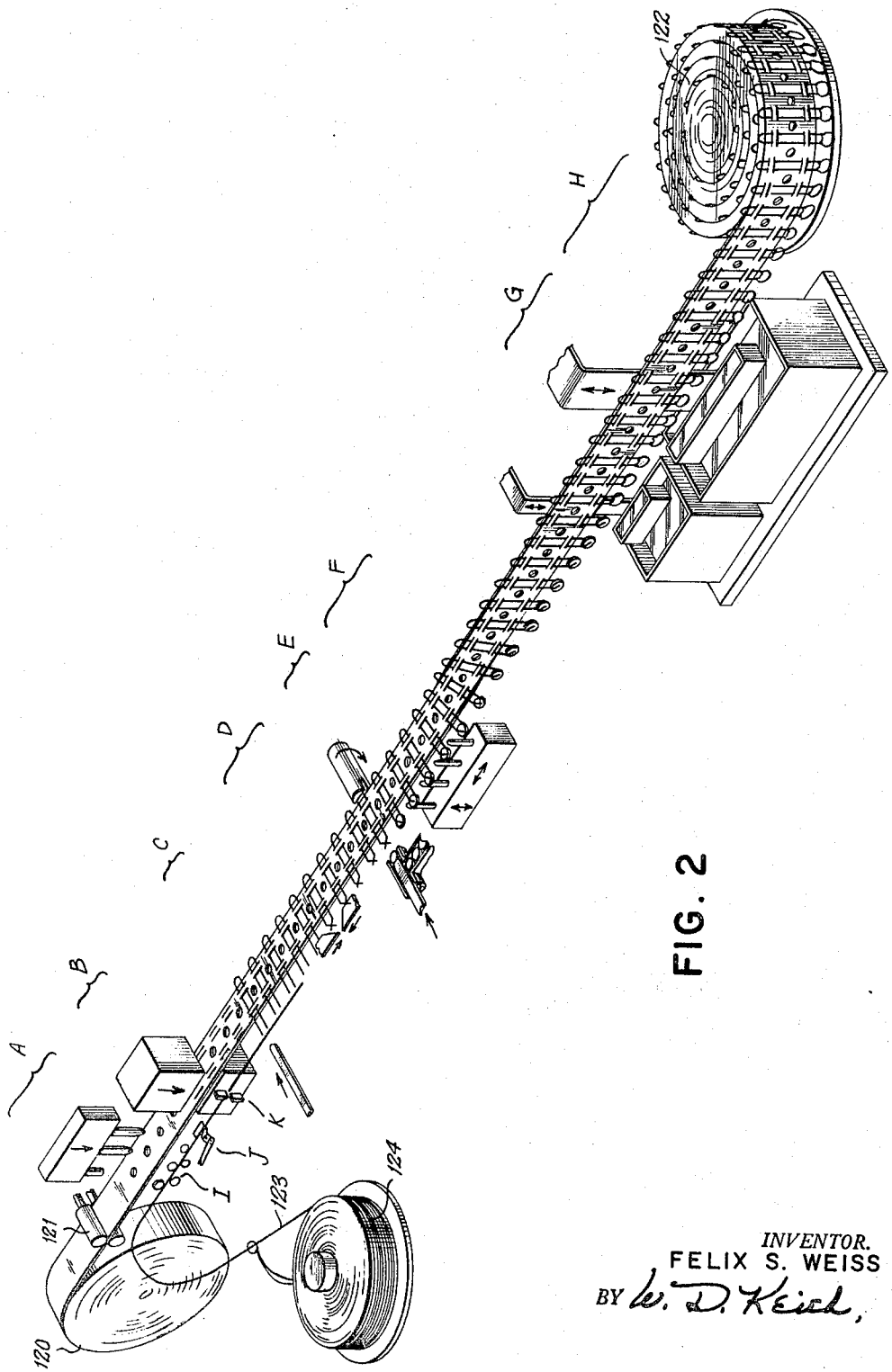
FIGURE 2 is a more detailed schematic flow diagram indicative of the essential and preferred operations necessary to the formation and processing of ceramic disc-type capacitor subassemblies through the soldering operation.

FIGURES 2 and 3 schematically illustrate the presently preferred sequence of operations for practicing the invention in the manufacture of ceramic disc capacitors as well as illustrating the essentials of apparatus presently preferred for effecting the fabrication of such units.

As shown in FIGURE 2, the conveyor material is drawn in strip or web form from a supply reel 120 by a pair of pressure rollers 121 and is continuously drawn successively through a series of operating stations such as a pilot hole perforating station A wherein a series of indexing pilot holes are punched in the web, a web slitting station B wherein spaced longitudinal slits are made in the web intermediate the pilot hole perforations therein, a terminal wire subassembly forming and insertion station C wherein a length of terminal wire is formed and inserted into the terminal wire subassembly mounting slits in the web, a terminal wire end-forming station D wherein the ends of the inserted terminal wire subassembly are deformed to receive a ceramic capacitor disc, and a ceramic disc insertion station E wherein ceramic capacitor discs are inserted into the deformed ends of the terminal wire subassemblies, by a web drive indexing unit F. The web drive unit F is, as will be described in detail at a later point in this specification, a cyclically operable unit arranged to intermittently advance the web a predetermined distance during each cycle of operation with intermediate dwell periods during which time the other operating components are actuated to perform their respective operative functions. Subsequent to the passage of the web through the web drive unit F, the web and the capacitor subassemblies mounted thereon are displaced to the vertical position and are drawn through a flux dipping station G wherein the mounted ceramic capacitor discs are treated with a flux and a solder dipping station H wherein the flux treated units are soldered by the winding reel 122. Cooperatively associated with the above-identified operating units is a terminal wire supply reel 124, a wire straightening station I, a terminal wire drive station J, and a terminal wire cutting station K all arranged to present a predetermined cut length of straightened terminal wire to the terminal wire insertion station C for the formation of the terminal wire subassembly and insertion of the same into the previously prepared web of dispensable conveyor material.

In actual operation it may be desirable to interrupt the above-described continuous process after the soldering operation to permit batch degreasing operations before resumption of a continuous flow process for production of complete units. Before describing the additional operations necessary to the production of finished units, as illustrated in FIGURE 3, I will first generally describe the nature of the essential mechanical elements that may be included in the above enumerated operating stations to effect the necessary mechanical operations in the practice of the process. Such description, however, will, in the interests of brevity, omit the details of the drive mechanisms necessary to effect the indicated modes of operation as such are matters of particular machine design and are well within the skill of the art.

1. *The pilot hole perforation station*

FIGURES 5, 6, 7 and 7a illustrate the essential mechanical components of the presently preferred construction for the pilot hole perforating station A, at which operating station indexing pilot holes are successively punched at predetermined and carefully spaced intervals in the intermittently advancing web of conveyor material.

The spaced pilot hole perforations permit the careful indexing of the conveyor material in the subsequent operating stations as well as providing means by which the web of conveyor material may be advanced a predetermined amount during each cycle of machine operation.

Referring to the drawings, there is provided a stationary die plate 126 having a plurality of vertically disposed spaced bores 128, 130 and 132 therein. Each of said bores contains a hardened die sleeve 134 with the upper ends thereof being disposed coplanar with the upper surface of said die plate 126 which in turn is disposed coplanar with the upper surface of an adjacent stationary web supporting shelf member 136. The shelf member 136 is positioned beneath a stationary channeled web guide member 138 and cooperates therewith to define an enclosed web guiding channel 140 sized to contain the advancing web of conveyor material 162 and to accurately position the same transversely to the direction of web advance. The channeled web guide member 138 is provided with suitable apertures 142, 144, 146 disposed in vertical alignment with the bores 128, 130 and 132, respectively, in the die plate 126 positioned therebeneath. Disposed above the die plate 126 and the channeled guide member 138 is a vertically reciprocable punch pad 148 having a punch member 150 and a pair of rounded end pilot pins 152 and 154 mounted therein so as to have the extending ends thereof 150a, 152a, and 154a in alignment with the bores 128, 130 and 132.

As best shown in FIGURE 7, the extending ends of the pilot pins 152 and 154 are of greater length than the extending end of the punch member 150. This length relationship permits the pilot pins, on the downward displacement of the vertically reciprocable punch pad 148, to pass through the previously punched pilot hole perforations in the web material 162 prior to engagement of said web material by the punch member 150, thereby assuring uniformity of spacing of said pilot hole perforations for indexing purposes in both this and subsequent operating stations.

The vertically reciprocable punch pad 148 also contains an auxiliary side punch 156 positioned to reciprocate through a suitably shaped aperture 158 in the edge portion of the channeled web guide member 138 and into operative cutting engagement with a complementally shaped die section 160 forming part of the stationary die plate 126. The side punch 156 is shaped to cut the edge portion of the web 162 as indicated at 161 on FIGURE 4b.

In operation of the above described unit, the untreated web 162 of dispensable conveyor material is intermittently advanced within the web guiding channel 140 by action of the cyclically operable web drive mechanism associated with the web drive station F and to be described in more detail at a later point in this specification. During each cycle of operation the web 162 is advanced an amount substantially equal to the spacing between successive pilot hole perforations 164 therein and is then halted during a predetermined dwell period to permit the necessary operations to be performed with respect thereto at the various operating stations. During the period of web advance, the vertically reciprocable punch pad 148 is positioned at or near its upward limit of displacement with the extending ends 152a and 154a of the pilot pins being maintained clear of the path of travel of the advancing web 162 within the web guiding channel 140. Upon cessation of web advance the punch pad 148 is downwardly displaced and the initial engagement of the descending rounded end pilot pins 152 and 154 with the previously punched pilot hole perforations 164 in the web 162 will effect an accurate prepositioning of the web material relative to the descending pilot hole punch 150, thereby assuring uniformity of spacing of the pilot hole perforations 164 therein.

Continuing downward displacement of the punch pad 148 results in pilot hole perforation of the web 162 by the descending punch 150 and in an edge perforation 161 (see FIGURE 4b) by the descending side punch 156. After completion of the above operations effected during the downward displacement of the punch pad 148, the pad 148 is upwardly displaced to disengage the dependent elements from the web 162 and thereby clear the web guiding channel 140 for further web advance during the next machine cycle.

Figure 4A:
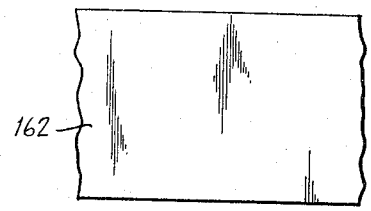
FIGURES 4a through 4i illustrate, in plan view, the successive stages of formation of the dispensable conveyor strip and successive stages of formation of the capacitor subassemblies thereon and is generally indicative of the sequence of fabrication operations.
Figure 4B:
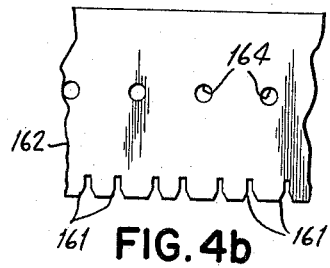

FIGURE 4a illustrates the configuration of the advancing web 162 prior to its introduction into the pilot hole perforation station A and FIGURE 4b illustrates the character of the web 162 as it exits therefrom. As there illustrated, the pilot hole perforations 164 are spaced a uniform distance apart and preferably substantially equidistant from the edges of the web. The edge cuts 161 are disposed intermediate the pilot hole perforations 164.

2. *The web slitting station*

Figure 4C:
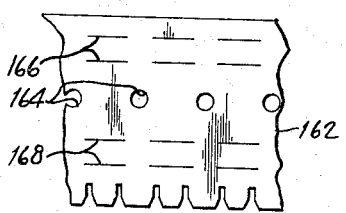

FIGURES 8-12 illustrate the mechanical essentials of the presently preferred apparatus included in the web slitting station B to provide spaced pairs of longitudinal slits 166, 168 in the web material 162 intermediate successive pilot hole perforations 164 therein as illustrated in FIGURE 4c.

Referring to the pertinent drawings, there is provided a stationary die pad 180 having a spaced pair of upwardly protruding bossed die inserts 182 mounted therein intermediate a plurality of recessed die inserts 183. Positioned above the stationary die pad 180 is a portion of the channeled web guide member 138 so arranged as to assure maintenance of the web material 162 closely adjacent the surface of the die pad 180. The portion of the channeled web guide member 138 disposed above the operating surface of the die inserts 182, 183 is provided with a suitable punch passing aperture as at 190. Cooperatively associated with the die inserts 182, 183 mounted in the stationary die pad 180 is a vertically reciprocable punch pad 184 having a pair of recessed punch inserts 186 mounted therein intermediate a plurality of bossed punch inserts 188. The punch inserts 186, 188 are arranged, as illustrated in the drawings, to cooperate with the die inserts 182 and 183 to produce two pairs of longitudinally disposed slits 166, 168 in the web material 162 intermediate each pair of pilot hole perforations 164 therein.

In order to assure proper longitudinal disposition of the pairs of slits 166, 168 intermediate the immediately adjacent pilot hole perforations 164 in the web, the above described web slitting structure is preferably disposed immediately adjacent to the previously described pilot hole perforation station A so that the pilot pins 152 and 154 therein can also function to insure proper web positioning in the web slitting station B. Alternatively, if said assembly is spaced any appreciable distance from the previously described pilot pins 152 and 154, it is desirable that the mechanical components associated with the web slitting station B include indexing means such as a pilot pin receiving base 192 and a pilot pin 194 as indicated by the dotted lines in the stationary die pad 180 and vertically reciprocable punch pad 184, respectively in FIGURE 10.

In operation of the above described presently preferred mechanical elements includable in the web slitting station, the vertically reciprocable punch pad 184 is positioned at or near its upward limit of displacement during that portion of operating cycle in which the web material 162 is being advanced intermediate the channeled web guide member 138 and the upper surface of the stationary die plate 180. Upon cessation of web advance, the punch pad 184 is downwardly displaced into operative engagement with that portion of the web material positioned above the die inserts 182, 183. The compressive engagement of the web intermediate the complementary operating surfaces of the punch inserts 186, 188 and the die inserts 182, 183 results in production of the desired two pairs of longitudinal slits 166 and 168 properly positioned relative to the adjacent pilot pin perforations 164. Following the slitting of the web material 162 effected at or near the limit of downward displacement of the punch pad 184, said punch pad is upwardly displaced to clear the web guiding channel 140 for permitted advance of the web material 162 during the next cycle of machine operation.

3. *Terminal wire insertion station (web manipulating components)*

FIGURES 13–18 illustrate the mechanical essentials of the presently preferred web manipulating apparatus included in the wire insertion station C. The web manipulating apparatus serves to upwardly displace those portions of the web 162 disposed intermediate each of the slits in each of the pairs of longitudinal slits 166 and 168 therein relative to the remainder of said web to form a transverse terminal wire sub-assembly receiving channel for insertion therein of a terminal wire assembly of the type illustrated at 202 on FIGURE 4d.

Referring to the above-indicated drawings, there is provided a stationary die block 204 having the upper surface thereof disposed coplanar with the upper surface of the previously described die block 180 in the web slitting station B. Mounted in the stationary die block 204 are five die inserts 206 through 210 (see FIGURES 17 and 18). The upwardly disposed operating surfaces of the die inserts 207 and 209 are similarly contoured and are positioned, transversely to the direction of web advance, so as to be disposed respectively, beneath those portions of the web disposed intermediate each of the slits in each of the longitudinal pairs of slits 166 and 168.

The operating surface of each of the die inserts 207, 209 is provided with a rectangularly shaped recess 213 bounded by a pair of transversely disposed upwardly directed shoulders 212 and 214. The shoulders 212, 214 are sized to extend upwardly beyond the outwardly adjacent die surface and are preferably sloped as indicated in the drawings. The die inserts 206 and 210 are positioned on either side of the above described die inserts 207, 209 and the die insert 208 is positioned between said inserts 207 and 209. So positioned, the die inserts 206, 208 and 210 are located to be disposed beneath those portions of the web material 162 positioned both externally to and intermediate the pairs of longitudinally disposed slits 166 and 168. The operating surfaces of the die inserts 206, 208 and 210 are provided with rectangularly shaped recesses 211, 215 and 217 respectively, the edges of which are sloped as at 219. As best shown in FIGURES 15 and 18, the centrally disposed die insert 208 is provided with a pair of pilot pin receiving bores 216, 218 adjacent the recess 215 therein. The die block 204 and the above described die inserts therein are positioned below a portion of the channeled web guide member 138 which is suitably apertured as at 219 to operative engagement of the die inserts by complementary vertically reciprocable pressure pad inserts to which we will now turn.

Cooperatively associated with the die pad 204 is a vertically reciprocable punch pad 220 having mounted therein five pressure pad inserts 222 through 226. The pressure pad inserts 223 and 225 are positioned to cooperatively engage the die inserts 207 and 209 respectively and the operating surfaces thereof are provided with rectangular recesses 213a sized to conform with the corresponding recesses 213 in said die inserts. The sides of the recesses 213a are sloped as at 212a and 214a so as to conform with the sloped surface of the shoulders 212 and 214 on the die inserts 208 and 209. In a similar manner the punch pad inserts 222, 224 and 226 are positioned to engage the die inserts 211, 215 and 217 respectively, and the operating surfaces thereof are recessed as at 211a, 215a and 217a. The recesses 211a, 215a and 217a are bounded by dependent shoulders such as at 236, 238, sized to extend downwardly beyond the adjacent punch pad surfaces and are provided with sloping sides contoured to conform with the sloping side walls 219 of the corresponding recesses 213, 215 and 217 in the die inserts 206, 208 and 210 respectively. The centrally disposed pressure pad insert 224 has mounted therein two dependent pilot pins 232 and 234 positioned to operatively engage, upon downward displacement thereof, the above described pilot pin receiving bores 216, 218 in the die insert 208.

In operation of the above described presently preferred web manipulating components of the terminal wire insertion station C, the vertically reciprocable pressure punch pad 220 and the pressure pad inserts 222–226 mounted therein are maintained at or near the limit of upward displacement during the period in which the web is advanced intermediate the channeled web guide 138 and the upper surface of the stationary die block 180. Upon cessation of the web advance portion of the cycle of operation, the web material will be disposed upon the upper surface of the die block 180 with successive pilot pin perforations 164 therein disposed in approximate alignment with the pilot pin receiving bores 216, 218 in the die insert 208. So positioned, the portions of the web material disposed intermediate the longitudinal slits in each of the pairs of slits 166, 168 will be disposed in approximate alignment over the recesses 213 in the die inserts 208 and 209 respectively. Downward displacement of the punch pad 220 results initially in engagement of the pilot pin perforations 164 in the web material by the dependent rounded end pilot pins 232 and 234 and, if required, in minor corrective alignment of the web material 162 relative to the die inserts 206–210. FIGURE 22a shows the disposition of the web material 162 immediately prior to compressive engagement thereof intermediate the die inserts 206–210 and the pressure pad inserts 222–226. Further downward displacement of the punch pad 220 results in compressive engagement of the web material 162, as illustrated in FIGURE 22b, intermediate the die inserts 206–210 and the pressure pad inserts 222–226. Such compressive engagement of the web material will result in the disposition of the portion of the web material 162 included between the slits in the pair of longitudinal slits 166, 168 against the surface of the recesses 213a in the pressure pad inserts 223 and 225 by the action of the shoulders 212, 214 in the die inserts 207 and 209 and in the disposition of the remaining portions of the web material 162 against the surfaces of the recesses 211, 215 and 217 in the die inserts 206, 208 and 210 by the action of the dependent shoulders 236, 238 in the pressure pad inserts 222, 224 and 226. With the web material so disposed, there is formed a transverse substantially rectangular terminal wire subassembly receiving channel 230 defined in part by the disposition of the web material 162 as described above and in part by the recessed areas disposed intermediate the extending shoulders on both the die inserts and pressure pad inserts.

The above described compressive engagement of the web material 162 intermediate the die block 180 and its above described die inserts and the punch pad 220 and its above described pressure pad inserts is maintained while insertion of a suitable terminal wire subassembly in the receiving channel 230 is effected. Before describing, however, the associated terminal wire subassembly forming and inserting mechanisms I will briefly describe the presently preferred mechanical essentials included in the terminal wire handling units that are required to present a predetermined length of terminal wire to the above partially described terminal wire insertion station C.

4. *The terminal wire straightening station*

As shown on FIGURE 2, the terminal wire 123 is drawn from a supply roll 124 thereof and is initially drawn through a terminal wire straightening station I to remove any bends, kinks or curvatures therein and to assure provision of a straight length of terminal wire for subsequent terminal wire subassembly formation. FIGURES 23 and 24 illustrate the essentials of the presently preferred mechanical components includable in such a terminal wire straightening station. As there illustrated, there is provided a horizontally disposed mounting plate 250 having rotatably mounted thereon a plurality of grooved guide rollers 252 arranged in two substantially parallel tiers. The individual guide rollers 252 in each of the tiers are positioned so that advancing terminal wire, threaded within the grooves 254 therein, will assume, irrespective of its entering shape, the configuration of a straight line tangent to all of said guide rollers 252. Disposed immediately adjacent the horizontally disposed mounting plate 250 is a vertically disposed mounting plate 256 having mounted thereon a plurality of grooved guide rollers 258 arranged in two substantially parallel tiers. The individual guide rollers 258 in each of the tiers are arranged so as to provide a pass line common with that of the rollers 252 mounted in the horizontally disposed plate 250.

In operation of the above described unit, the terminal wire 123 is drawn therethrough by the action of the wire feed unit, to be hereinafter described. The arrangement of the vertically and horizontally disposed grooved guide rollers 252, 258 is such as to straighten any curvature or coil set present in the terminal wire 123 issuing from the supply roll 124. As the wire exits from the straightening station I it will be perfectly straight and moving in a direction parallel to that of the advancing web 162 as generally indicated on FIGURE 2.

5. The terminal wire feed station

FIGURES 25, 26 and 27 illustrate the essentials of the presently preferred mechanical components includable in the wire feed station A, at which location the straightened terminal wire is intermittently advanced a predetermined amount during each cycle of machine operation in a path parallel to that of the advancing web material 162. Referring to the above identified drawings, there is provided an eccentric drive head 260 mounted on a rotatable drive shaft 262. The eccentric drive head 260 is connected, as by a rotatably mounted pin 264, to one end of a curved wire feed arm 266. The other end of the wire feed arm 266 is connected by a pin 268 to the lower portion of a wire gripper pivot arm 270. The wire gripper pivot arm 270 is rotatably mounted adjacent its mid-length on one end of a pin 272, the other end of which is rotatably supported by the side wall of a wire drive head 274. The wire drive head 274 is slidably mounted on a horizontally disposed slide member 276. So arranged, the wire gripper pivot arm 270 is pivotally mounted relative to the horizontally displaceable drive head 274. The upper portion of the wire drive head 274 is positioned in line with the straightened terminal wire 123 exiting from the wire straightening station I previously described and the entry end thereof is provided with a horizontally disposed terminal wire receiving bore 278 therein. The bore 278 is suitably sized to permit free displacement of the wire drive head 274 relative to said wire 123 during displacement of said head toward said straightening station I. The bore 278 also serves to position the terminal wire 123 relative to the terminal wire engaging surface 282 of the drive head 274. The wire gripper pivot arm 270 is provided with a wire engaging surface 280 pivotally displaceable into compressive engagement with the portions of the terminal wire 123 disposed adjacent the wire engaging surface 282 of the drive head 274. The amount of pivotal displacement of the pivot arm 270 in a counterclockwise direction is limited by the aforesaid compressive engagement of the terminal wire and in the clockwise direction is limited by a stop pin 284.

In operation of the unit, rotation of the drive shaft 262 results in rotative displacement of the eccentric drive head 260. The rotative displacement of the eccentric drive head 260 is translated into guided horizontal reciprocation of the drive head 274 on the slide member 276, due to the limited permitted pivotal displacement of the pivot arm 270 relative to said drive head 274. As specifically illustrated in FIGURE 20, the wire drive head 274 is positioned at or near its limit of retracted position. Rotation of the drive shaft 262 will result in a positive horizontal advance of the end of the wire feed arm 266. The initial horizontal advance of the wire feed arm 266 results in a counterclockwise rotative displacement of the wire gripper pivot arm 270 around the pin 272 and relative to drive head 274. This rotative displacement will be halted by the compressive engagement of the terminal wire 123 intermediate the wire engaging surfaces 280 and 282 of the pivot arm 270 and drive head 274 respectively. Following cessation of rotative displacement of the pivot arm 270 relative to the wire drive head 274, further horizontal advance of the feed arm 266 results in horizontal advance of the drive head 274 relative to the slide member 276. Horizontal advance of the drive head 274 results in concurrent advance of the terminal wire 123 due to the aforesaid compressive engagement thereof intermediate the wire engaging surfaces 280 and 282.

When the limit of forward displacement of the feed arm 266 is reached, advance of the wire drive head 274 relative to the slide member 276 will cease. Initial return displacement of the wire feed arm 266 will result in a clockwise rotative displacement of the wire gripper pivot arm 270 about the mounting pin 272 and hence relative to the drive head 274. Such rotative displacement results in separation of the wire engaging surfaces 280 and 282 and in a release of the previously compressively engaged wire 280. Rotative displacement of the pivot arm 270 relative to the drive head 274 will continue during return of the feed arm 266 until said pivot arm 270 engages the stop pin 284, at which time retraction of the feed arm 266 will result in concurrent retraction of the drive head 274 relative to the slide 276 and relative to the previously advanced terminal wire 123.

The above-described essentials of the presently preferred mechanical components form the major elements of a terminal wire drive of the so-called "hitch-feed" type. The amount of advance of the terminal wire 123 during each cycle of machine operation may of course be accurately controlled by adjustment of the length of stroke of the feed arm 266.

6. Terminal wire insertion station (wire forming and insertion components)

As described in the earlier portions of this specification relating to the web manipulating components included in the terminal wire subassembly insertion station, the pressure pad inserts 222–226 and the die inserts 206–210 cooperate to raise those portions of the web material 162 disposed intermediate each of the slits in the pairs of slits 166, 168 upwardly and to depress the remaining portions of said web material and to form in conjunction therewith a transversely disposed terminal wire subassembly receiving channel 230 sized to receive and contain a terminal wire subassembly therein.

FIGURES 28 and 19 illustrate the essentials of the associated wire manipulating components adapted to cooperate with the heretofore described web manipulating components to effect the desired formation of a terminal wire subassembly and the insertion of said subassembly into the terminal wire subassembly receiving channel 230 formed in the web material 162. Referring to the above identified drawings, there is provided an associated terminal wire cutting assembly (schematically shown at 293 on FIGURE 19) arranged to sever an advanced length of terminal wire 294 positioned in front of a pair of stationary wire forming dies 296 and 298. As shown in more detail in FIGURE 28, the presently preferred terminal wire cutting assembly includes a stationary wire guide bushing 300 having an axially disposed bore 302 therewith sized to freely pass an advancing length of terminal wire 294 and to properly direct the advance of the same into operational location in front of the wire forming dies 296, 298. Positioned in sliding contact against the cutting edge 304 of the wire guide bushing 300 is a horizontally reciprocable cutting knife 306 having a substantially conically shaped aperture 308 therethrough with the apex thereof disposed adjacent to and in alignment with the bore 302 of the wire guide bushing 300. The terminal wire cutting knife 306 is mounted in a suitable fixed slide platform 310 and is horizontally reciprocated therein through the connecting pin 312 and an adjacent horizontally disposed drive slide 314. The drive slide 314 is connected to a cam follower 316 disposed in engagement with a suitably contoured drive cam 318 mounted on a drive shaft 320.

In operation of the unit, a length of straightened terminal wire 294 is advanced, by the hitch-feed drive mechanism previously described in connection with the wire feed station J, through the bore 302 in the terminal wire guide bushing 300 and through the aperture 308 in the cutting knife 306 and into position in front of the wire bending dies 296, 298. With the advanced length of terminal wire 294 so located, the drive slide 314 under control of the drive cam 318 is retracted. The retraction of the drive slide 314 is transmitted through the connecting pin 312 into equivalent retraction of the cutting knife 306 relative to the bushing 300. The retraction of the cutting knife 306 effects a horizontal displacement of the apex of the aperture 308 therein relative to the bore 302 in the bushing 300 and effects a sharp severing of the advanced length of the terminal wire 294. Following the severing of the terminal wire as described above, the drive slide is advanced to again replace the aperture 308 in the knife 306 in alignment with the bore 302 in the wire guide bushing to permit the subsequent advance of another length of terminal wire 294 into operative position in front of the wire forming dies 296, 298 during the next cycle of machine operation.

At the conclusion of the above-described sequence of operation, a severed length of terminal wire 294 is positioned in front of the wire bending dies 296, 298. In order to form this length of terminal wire 294 into a terminal wire subassembly and to effect the insertion of such formed subassembly into terminal wire subassembly receiving channel 230 formed in the web 162, there is provided an elongate horizontally reciprocable pressure finger 322 positioned to be advanced into the terminal wire receiving channel 230 as defined by the web material 162 and the operative surfaces of the pressure pad inserts 222–226 and the die inserts 206–210. The pressure finger 322 is sized to pass through said channel and to abut the cut length of terminal wire 294 positioned immediately in front of the wire forming die members 296, 298. The pressure finger 322 is mounted on a horizontally reciprocable drive slide 324 and is accurately positioned, with respect to its path of horizontal displacement, by a fixed slide platform 326. The drive slide 324 is connected to a cam follower 328 disposed in operative engagement with a suitably contoured drive cam 330. Cooperatively associated with the pressure finger 322 is an elongate horizontally reciprocable wire forming finger 332 positioned in front of the opening intermediate the die members 296, 298. The wire forming finger 332 is mounted on a horizontally reciprocable drive slide 334, and is accurately positioned, with respect to its path of reciprocation, by a fixed slide platform 336. The drive slide 334 is connected to a cam follower 338 disposed in operative engagement with a suitably contoured drive cam 340.

Figure 4D:
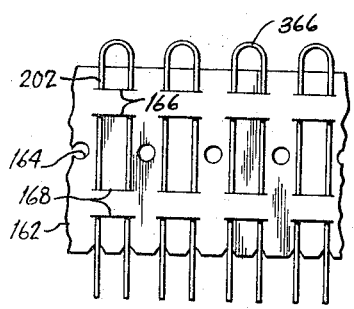

In operation of the unit and subsequent to the formation of the terminal wire subassembly receiving channel 230 by the previously described web manipulating components, the horizontally-reciprocable pressure finger 322 is advanced through said terminal wire subassembly receiving channel 230. At its limit of advance the end of the pressure finger 322 extends through the opening intermediate the die members 296, 298 and is disposed in abutting engagement with the terminal wire 294 positioned in front of said die members. With the pressure finger 322 so positioned, the wire forming finger is advanced into abutting engagement against the other side of said terminal wire 294 positioned in front of said die members 296, 298. With the pressure finger 322 and wire forming finger 332 so positioned, the pressure finger is retracted in conjunction with an advance of the wire forming finger 332. The advance of the wire forming finger 332 results in displacement of the terminal wire 294 through the opening between the wire forming dies 296 and 298 and in deformation of the same into a terminal wire subassembly such as illustrated in FIGURE 4d. Continued advance of the wire forming finger 332 and conjunct retraction of the pressure finger 322 results in insertion of said formed terminal wire subassembly in the terminal wire receiving channel 230 in the web material 162 as also illustrated in said FIGURE 4d. When the limit of advance of the wire forming finger 332 is reached, said forming finger is retracted and both the pressure finger 322 and the forming finger 332 are maintained in retracted position until the next cycle of the machine operation.

*7. The terminal wire subassembly end forming station*

Figure 4E:
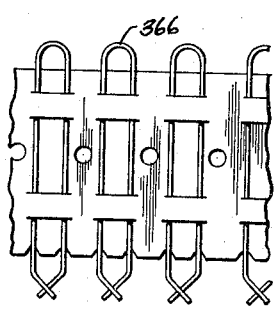

FIGURES 29 through 35 illustrate the essentials of the presently preferred mechanical components includable in the terminal wire subassembly end forming station D, wherein the straight open ends of the terminal wire subassembly that extend beyond the edge of the web 162, as illustrated in FIGURE 4d, are crossed to provide a formed terminal wire subassembly shaped as illustrated in FIGURE 4e.

Referring to the above-identified drawings, there is provided a stationary die pad 350 having a twisting die block 354 mounted therein and containing a pair of pilot pin receiving bores 356, 358 in the adjacent web supporting surface 357 thereof and positioned therein in alignment with the path of advance of the pilot pin indexing perforations 164 in the advancing web material 162. The pilot pin receiving bores 356, 358 are spaced apart a distance equal to that between successive perforations 164 in said web material 162. The twisting die block 354 is located so as to be disposed adjacent the edge of the web 162 and to engage the undersurface of the rounded edge portion 366 (see FIGURE 4d) of the successively advancing web mounted terminal wire subassemblies that extends beyond the edge of the web. Positioned in front of the stationary die pad 350 is a stationary die block section 360. The die block section 360 is provided with a diagonally disposed raised shoulder 362 on the upper surface thereof terminating in a generally triangularly shaped wire forming anvil receiving aperture 364. The lower surface 361 of the die section 360, i.e. that disposed beneath the raised shoulder 362, is positioned to be substantially coplanar with the web supporting surface 357 of the stationary die pad 350. The diagonally disposed raised shoulder 362 is preferably of a height slightly greater than the thickness of the terminal wire that is to be employed for the terminal wire subassemblies.

Positioned above the stationary die pad 350 is a vertically reciprocable punch pad 352 having a twisting punch member 368, a pair of pilot pins 370, 372, a specially contoured web holding insert 376 and a dependent elongate wire forming anvil member 378 mounted thereon and positioned in alignment, respectively, with the previously described twisting die block 354, the pilot pin receiving bores 356, 358, the web supporting surface 357, and the anvil receiving aperture 364 associated with the stationary die pad 350.

With respect to the specific type of capacitor here of concern, it is required that the extending open and coplanar end portions of the web mounted terminal wire subassembly be disposed in different planes to permit the necessary deformation thereof to the shape illustrated in FIGURE 4e. To effect the requisite planar differentiation of the undeformed extending open end portions of the web mounted terminal wire subassembly, the terminal engaging surfaces of the twisting die block 354 and the twisting punch member 368 are skewed as best shown at 380 in FIGURE 32. Cooperating therewith to effect the planar differentiation between the extending open ends of the terminal wire subassembly is the dependent surface contour of the web holding insert 376 mounted in the vertically reciprocable punch pad 352. The essentials of a suitable surface contour for the web holding insert 376 is shown in FIGURES 33 and 31 and preferably includes a pair of recessed channels 386 sized to contain the raised portions of the web 162 disposed between the longitudinal slits in each pair of slits 166, 168 and positioned above the mounted terminal wire subassembly, a transversely disposed raised center section 388 sized to compressively engage the portions of the web material 162 disposed beneath the web mounted terminal wire subassembly and intermediate the elongate arms thereof and a pair of elongate recessed channels 385 in alignment with the arms of the web mounted terminal wire subassembly and sized to permit limited play thereof relative to the portions of the web 162 compressively engaged by the raised center section 388. In its essentials, the surface contour of the web holding insert 376 should be such as to compressively position the portion of the web 162 disposed beneath the terminal wire subassembly and intermediate the elongate arm thereof against the adjacent portions of supporting surface 357 in the die pad 350, but yet permit sufficient room for a slight vertical displacement of the arms of the web mounted generally U-shaped terminal wire subassembly and the portions of the web material overlaying the same under influence of the twisting action being effected by the cooperative action of the twisting die block 354 and the twisting punch member 368. The combined result of preventing web displacement and permitting the twisting of the terminal subassembly from the extending rounded end thereof is to tend to lower one of the extending open ends of the web mounted terminal wire subassembly and to raise the other. The lowering of the one free end, however, will be prevented by the surface 361 of the die block section 360 and the net result thereof will be to maintain said end firmly disposed against said surface 361. All displacement, therefore, will take place with the other extending end of said web mounted terminal wire subassembly which will be raised above the elevated surface of the die block section 360 as defined by the raised shoulder 362 thereon.

The dependent wire forming anvil member 378 is positioned so as to be received by the aperture 364 and disposed intermediate the open extending ends of the web mounted terminal wire subassembly being operated upon. In the specifically illustrated structure it is shaped so as to define the desired degree of bend for said extending ends and is of a generally triangular configuration.

Before turning to the additional mechanical elements which effect the desired bending of the open extending ends of the web mounted terminal wire subassembly around the operating surfaces of the wire forming anvil member 378, I will briefly review the sequence of operations effected by mechanical elements heretofore described. In operation of the unit, the vertically reciprocable punch pad 352 is maintained at its uppermost limit of displacement as the web 162 having the terminal wire subassemblies mounted thereon as illustrated in FIGURE 4d is advanced during the web advance cycle of operation by the web driving mechanism to be hereinafter described. Upon cessation of web advance, an undeformed terminal assembly is generally positioned intermediate the pilot pin receiving bores 356 and 358. Downward displacement of the vertically reciprocable pressure pad 352 results in engagement of the pilot pin indexing apertures 164 in the web 162 by the descending pilot pins 370, 372 and in any required corrective positioning of the web mounted terminal wire subassembly to be operated upon relative to the mechanical deforming elements included in this operating station. Coincidentally therewith, the dependent wire forming anvil member 378 will enter its receiving aperture 364 and will be positioned intermediate the open extending coplanar ends of the web mounted terminal wire subassembly. Continued downward displacement of the pressure pad 352 relative to the stationary die pad 350 results in engagement of the extended round end portions of the web mounted terminal wire subassembly by the skewed operating surfaces 380 of the twisting punch member 368. Coincidentally therewith the contoured operating surface 388 of the web holding insert 376 engages that portion of the surface of the web 162 that is disposed beneath the terminal wire subassembly and intermediate the arms thereof and compressively maintains the same against the adjacent portions of the web supporting surface 357 in the stationary die pad 350. The twisting movement effected by the skewed surfaces 380 of the twisting die block 354 and the twisting punch member 368 relative to the firmly positioned portions of the web material 162 will as described earlier, result in the maintaining of one of the extending ends of the web mounted terminal wire subassembly disposed against the surface 361 of the dies section 360 and in the elevation of the other extending end of the web mounted terminal wire subassembly above the adjacent elevated surface of the dies section 360 as defined by the raised shoulder 362 thereon. With the extending open ends of the web mounted terminal wire subassembly so positioned on either side of the wire forming anvil 378, the unit is then properly positioned for the necessary deformation of the extending end portions thereof.

The desired deformation of the extending ends of the web mounted terminal wire subassembly is effected by a pair of horizontally displaceable wire deforming slides generally designated 382, 384 and which are mounted on the front face of the vertically reciprocable pressure pad 352 so as to be horizontally displaced into engagement with the extending terminal wire ends and to bend the same into conformity with the adjacent operating surfaces of the wire forming anvil 378. As best shown in FIGURES 29 and 33–35, the deforming slide 382 is provided with an extending horizontally disposed wire engaging foot 387 adapted to ride on the surface 361 of the die section 360 and provided with a wire engaging edge portion contoured to conform with the adjacent operating surface of the wire forming anvil 378. The second wire deforming slide 384 is provided with a wire engaging foot 389 adapted to ride on the upper surface of the die section 360 as defined by the raised shoulder 362 and the wire engaging edge portion thereof is contoured to conform with the adjacent operating surface of the wire forming anvil 378. The first slide member is suitably recessed above the wire engaging foot portion 387 thereof to permit receipt therein of the wire engaging foot 389 of the second wire deforming slide 384 when said slides are displaced into operative engagement with each other as illustrated in FIGURES 33 and 35.

As previously described, downward displacement of the pressure pad 352 relative to the stationary die block 350 results in planar differentiation of the extending ends of the web mounted terminal wire subassembly disposed on either side of the wire forming anvil member 378. With the extending ends so positioned, the horizontally reciprocable wire deforming slide members 382 and 384 are displaced towards each other. The displacement of the slide 382 results in engagement of the extended end of the terminal wire that rests on the surface 361 of the die section 360 by the wire engaging edge portion of the extended foot 388 thereof and in a bending of said extending wire end into conformance with the shape of the adjacent operating surface of the anvil member 378. In a similar manner, simultaneous horizontal displacement of he second slide 384 results in deformation of the elevated wire end into conformance with that of the adjacent operating surface of the wire forming anvil 378.

After the deformation of the extending ends of the web mounted terminal wire subassembly has been effected by the conjoint action of the deforming slides 382 and 384 and the adjacent operating surfaces of the wire forming anvil 378 as described above, the deforming slides 382, 384 are retracted in conjunction with an upward displacement of the vertically reciprocable pressure pad 352. The thus effected release of the web 162 and the now deformed terminal wire subassembly mounted thereon permits the arms of the terminal wire subassembly to attempt to return to a coplanar relationship. However, the now deformed crossed ends prohibit a complete return to such condition and result in a compressive engagement between said crossed ends at the point of contact thereof. After the pressure pad 352 reaches its limit of upward displacement, the next cycle of web advance permits delivery from the above described operating station of a web mounted deformed terminal wire subassembly such as illustrated in FIGURE 4e.

8. *The ceramic disc insertion station*

Figure 4F:
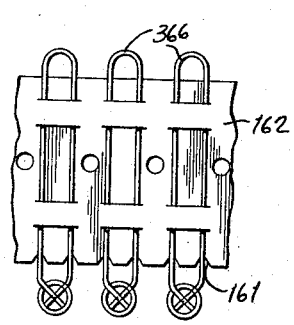

FIGURES 36 to 38 illustrate the essentials of the presently preferred mechanical elements includable in the ceramic disc insertion station E wherein previously prepared ceramic capacitor discs having metallic conducting layers on the opposite faces thereof are inserted intermediate previously described deformed ends of the terminal wire subassembly so as to form a capacitor subassembly such as is illustrated in FIGURE 4f.

Referring to the above-identified drawings, there is provided a stationary die block 394 having a pair of pilot pin receiving bores 396, 398 disposed therein and spaced apart a distance equal to that between two successive pilot pin perforations 164 in the web 162. As best shown in FIGURE 37, the surface of the die block 394 is sloped downwardly from the bores 396, 398 transversely of the strip, so as to facilitate a twisting displacement of the web mounted terminal wire subassemblies in the necessary separation of the crossed ends thereof. Positioned above the stationary die block 394 is a vertically reciprocable pressure pad 400 having a pair of dependent pilot pins 402, 404 mounted therein in such manner as to be received by the pilot pin receiving bores 396, 398 upon downward displacemtnt thereof. Disposed to one side of the advancing web 162 and positioned to engage the extending rounded end portions of the web mounted subassemblies is a twisting screw 406. The twisting screw 406 is provided with a horizontally disposed slot 408 into which the extending rounded ends of the web mounted subassemblies are advanced by the advancing web 162. The twisting screw 406 is rotated through a predetermined angular displacement by the bevel gears 410, 412 and a rocker arm assembly 414.

Operatively associated with the terminal wire subassembly twisting mechanism as described above is an assembly to separate the crossed ends that extend beyond the other edge of the web 162. There is provided a dependent toothed terminal wire separating finger 416 mounted on the vertically reciprocable pressure pad 400 and positioned to engage the lower extending terminal wire adjacent the bent end thereof and to depress the same a predetermined amount at the limit of downward displacement of said pressure pad 400. Cooperatively associated therewith is a pivotally mounted wire separating finger 418 adapted to be pivotally displaced upwardly against the underside of the upper crossed terminal wire adjacent the bent end thereof by downward displacement of dependent actuating arm 420 mounted on the vertically reciprocable pressure pad 400. The wire separating fingers 416 and 418 cooperate upon downward displacement of the pressure pad 400 to separate the crossed ends of the web terminal wire subassembly positioned intermediate the dependent pilot pins 402 and 404.

Insertion of the ceramic disc capacitor units intermediate the separated crossed ends of the web mounted terminal wire subassembly is effected by a horizontally disposed reciprocable slide 424. The end thereof is provided with a recessed ceramic disc containing sector 426 preferably shaped as illustrated in FIGURE 36. The depth of the recessed sector 426 should be equal to or slightly less than the thickness of the ceramic disc capacitor units being handled. The slide 424 is positioned so that the recessed sector 426 at the end thereof is disposed beneath a vertically disposed ceramic disc supply tube 428 when said slide is at the limit of its retracted position. So positioned the lowermost capacitor disc 429 in the supply tube will drop into and be contained within the sector 426 at the limit of retraction of the slide 424. Advance of the slide member 424 will result in advance of the disc 429 into position intermediate the separated crossed ends of the web mounted terminal wire subassembly.

In operation of the above described unit, the web 162 of dispensable conveyor material having deformed terminal wire subassemblies, such as illustrated in FIGURE 4e, mounted thereon is advanced into operative position above the stationary die block 394 by the action of the web drive mechanism to be hereinafter described. Web advance introduces the extended round end portion of the terminal wire subassembly into the slot 408 in the twisting screw 406. After cessation of web advance, initial downward displacement of the pressure pad 400 results in engagement of the pilot pin perforations 164 in the web material 162 by the descending dependent pilot pins 402, 404 and in any required minor corrective adjustment of the positioning of the conveyor web 162 and terminal assembly mounted thereon relative to the manipulating elements as above described. Coincidental with the downward displacement of the pressure pad 400, rotation of the twisting screw 406 is commenced.

Continuing downward displacement of the pressure pad 400 results in engagement and downward displacement of the extending end of the terminal wire subassembly by the separating finger 416 and in engagement and upward displacement of the extending end of the terminal wire subassembly by the pivotally mounted separating finger 418. The positive displacement of the extending ends of the web mounted terminal wire subassemblies by the separating fingers 416, 418 in conjunction with the twisting thereof as effected by the screw 406 results in a predetermined separation of the crossed ends of the terminal subassembly to permit receipt therebetween of a ceramic capacitor disc.

With the crossed ends of the terminal wire so separated, the insertion slide 424 is advanced to position the ceramic disc capacitor unit 429 disposed in the sector 426 at the end thereof intermediate said separated crossed ends. After advance of the insertion slide 424 to effect the desired positioning of a ceramic disc capacitor unit intermediate the opened crossed ends of the web mounted terminal wire subassembly, the twisting screw 406 is returned to its rest position and coincidentally therewith the pressure pad 400 is upwardly displaced. The upward displacement of the pressure pad 400 and the return of the twisting screw 406 to its rest position results in a permitted closure of the separated ends of the web mounted terminal wire subassembly into engagement with the surfaces of the ceramic capacitor disc positioned therebetween. After the advanced ceramic disv by the crossed ends of the web mounted terminal wire subassembly, the ceramic disc feed slide 424 is retracted to its rest position, at which time the lowermost disc disposed in the supply tube 428 will be received within the sector 426 at the end of the slide.

At the conclusion of the above series of operations, a capacitor subassembly consisting of a ceramic disc type of capacitor unit compressively disposed intermediate the deformed crossed ends of the web mounted terminal wire subassembly, such as illustrated in FIGURE 4f, has been formed and will be delivered from the above described ceramic disc insertion station E during the next cycle of web advance.

9. *The web drive indexing station*

FIGURES 39–41 illustrate the essentials of the presently preferred mechanical components includable in the web drive indexing station F wherein the web 162 of conveyor material is advanced through the previously described operating stations by a predetermined amount during each cycle of machine operation.

Referring to the above specified drawings, there is provided a vertically disposed horizontally displaceable slide member 430. Disposed therein are a pair of vertical recessed guide channels 432 and 434 sized to contain guide rollers 436 and 438 respectively for an adjacent horizontally disposed and vertically displaceable pilot pin mounting plate 440. The horizontally disposed plate 440 has a plurality of vertically disposed pilot pins 441–446 mounted thereon so that each of said pins is spaced apart a sufficient distance to engage successive pilot pin perforations 164 in the web material 162. Dependent from the underside of the pilot pin mounting plate 440 are a pair of support rollers 448 and 450 disposed on the surface of a vertically displaceable track member 452.

In order to insure alignment of the web 162 relative to the pilot pins 441–446, a horizontally disposed guide channel 454 is provided. The guide channel 454 is provided with a vertically disposed pilot pin receiving slot 456 of a length sufficient to accommodate the length of stroke of horizontal displacement of the pilot pins 441–446 inclusive.

Through the above described construction the slide member 430 is adapted to be horizontally reciprocated with a length of stroke equal to the spacing between two successive pilot pin indexing perforations 164 in the web material 162 by the drive link 458. The horizontally disposed pilot pin mounting plate 440 is adapted to be vertically reciprocated with a length of stroke sufficient to effect engagement and disengagement of the pilot pin indexing perforations 164 in the web 162 through vertical reciprocation of the track member 452. The disposition of the rollers 436 and 438 within the recessed channels 432 and 434 also assures that the plate 440 will be horizontally reciprocated in conjunction with the horizontal reciprocation of the vertically disposed slide member 430.

In operation of the above described unit, strip advance is effected by initially positioning both the vertically disposed slide member 430 at its retracted position. The vertically displaceable track member 452 is then raised, effecting a concurrent upward displacement of the horizontally disposed pilot pin mounting plate 440. Such displacement causes the pilot pins 441–446 to engage the pilot pin indexing perforations 164 in the web 162. With the pilot pin mounting plate 440 so positioned an advance of the slide member 430 by an amount equal to the spacing between two successive pilot hole perforations 164 in the web 162 will effect a concurrent advance of the mounting plate 440 and the web material 162 engaged by the pilot pins 441–446 mounted thereon. Upon cessation of advance of the slide member 430 the displaceable track member 452 is downwardly displaced and the consequent lowering of the plate 440 causes the pilot pins 441–446 to be disengaged from the pilot pin indexing perforations 164 in the web material 162. After disengagement of the pilot pins 441–446 from the perforations 164 in the web material 162, the slide member 430 is retracted, carrying with it the lowered pilot pin mounting plate 440. The above sequence of operations is performed once during each machine cycle, to thereby advance the web 162 a distance equal to the spacing intermediate successive pilot pin perforations 164 therein.

The action of the above described mechanism results in a drawing of the web material 162 through each of the previously described operating stations and in addition thereto aids in maintaining the web mounted terminal wire and capacitor subassemblies securely positioned relative to the web itself due to the tension applied to the web during the advance cycles.

10. *The flux and soldering dip stations*

FIGURES 42 through 44 illustrate the essentials of the presently preferred mechanical elements includable in the flux and solder dip stations G and H respectively, wherein the web mounted capacitor subassemblies, as illustrated in FIGURE 4f, are initially flux treated and the solder-dipped so as to secure a soldered connection intermediate the metallic electrode layers on the ceramic discs and the portions of the terminal wire disposed in contact therewith.

Referring to the above identified drawings, and first considering the flux dip station G, there is provided a vertically disposed supporting standard 460. Pivotally mounted thereon as at 462 is a rocker arm 464 which supports an extending cam follower 474. One end 466 of the rocker arm 464 is biased by a tension spring 468 so as to maintain the cam follower 474 against the surface of a drive cam 476 mounted on a shaft 478. The other end 470 of the rocker arm 464 is pivotally connected to a substantially vertically disposed flux ladle supporting arm 474 having a flux ladle 474 secured to the dependent end thereof. An auxiliary link member 476 connects the lower portion of the flux ladle supporting arm 472 to the supporting standard 460 to prevent oscillation of the dependent flux ladle 474. Rotation of the cam 476 results in an alternate raising and lowering of the flux ladle 474 in a substantially vertical path. Positioned beneath the flux ladle 474 so that said ladle is immersed therein at its lower limiting position is a flux containing trough 480. Associated with the above described mechanical elements is a fixed web guide 482. The web guide 482 is disposed to position the web mounted ceramic disc capacitor subassemblies 484 so that the dependent ceramic capacitor discs are immersed in the flux contained in the flux ladle 474 when said ladle is at its uppermost limit of displacement. As best illustrated on FIGURE 2, it should be noted that in all of the previously described operating stations the web of dispensable conveyor material 162 was horizontally disposed whereas in the two stations here being described the strip is required to be vertically disposed. The 90 degree change in web disposition may require the utilization of one or more positioning guides intermediate the web drive indexing station F and the flux dip station G.

In operation of the above described unit, the web 162 is issued from the web drive indexing station F in increments equalling the spacing intermediate successive pilot pin indexing perforations 164 therein. As shown on FIGURE 2 a winding reel is provided to provide the necessary drawing tension to keep the web 162 taut as it is incrementally advanced through the flux dip station G in accordance with its rate of delivery from the drive station F. During web advance the flux ladle 474 is maintained at its lowermost limit of displacement and is immersed in the flux contained within the flux trough 480. Upon cessation of web advance, rotation of the cam 476 effects an upward displacement of the flux ladle 474 and in an immersion of the dependent capacitor disc and the portions of the terminal wire subassembly in engagement therewith of the web mounted capacitor subassembly in the flux contained within the elevated flux ladle 474. Continued rotation of the cam 476 permits a return of the flux ladle 474 to the trough 480 to be there maintained during the next cycle of web advance.

In the illustrated apparatus, a single flux dip for each of the web mounted capacitor subassemblies is provided. If a multiple dip is desired, all that is required is to enlarge the flux ladle 474 to permit immersion of two or more adjacent dependent discs per stroke.

The surface contour of the drive cam 476 preferably should be such as to effect a relatively slow rate of immersion of the web mounted ceramic capacitor disc in the flux ladle 474 so as to prevent cracking of the ceramic unit. On the down stroke the rate of withdrawal should also be relatively slow until the web mounted dependent capacitor disc is almost entirely removed from the flux in the flux ladle 474. At this point the speed of withdrawal of the ladle 474 should be increased so as to rapidly remove the remaining portion of the immersed capacitor from the flux solution. Such rapid removal of the flux in the flux ladle 474 from the ceramic disc aids materially in preventing miniscus or teardrop flux formation on the dependent end of the ceramic disc assembly.

The essentials of the presently preferred mechanical elements includable in the solder dip station H may be substantially the same as those just previously described in conjunction with the flux dip station G. Referring to the above identified drawings and now considering the solder dip station H, there is provided a vertically disposed standard 490. Pivotally mounted thereon, as at 492, is a rocker arm 494 which supports an extending cam follower 496. One end 498 of the rocker arm 494 is biased by a tension spring 500, so as to maintain the cam follower 496 against the surface of a suitably contoured drive cam 502 mounted on the shaft 478. The other end of the rocker arm 494 is pivotally connected to a substantially vertically disposed solder ladle supporting arm 504 having a solder ladle 506 secured to the dependent end thereof. Rotation of the drive cam 502 results in alternate raising and lowering of the solder ladle 506 in a substantially vertical path. Positioned beneath the solder ladle 506, so that said ladle is immersed therein at its lowest limiting position, is a molten solder containing trough 508.

In operation of the above described unit, the web 162 issues from the flux dip station G in increments, as previously described, equal the spacing between successive pilot pin indexing perforations 164 therein. During the portion of the operating cycle devoted to web advance, the solder ladle 506 is maintained at its lowermost limit of displacement and is immersed in the molten solder contained within the solder trough 508. Upon cessation of web advance, rotation of the drive cam 502 effects an upward displacement of the solder ladle 506 and in an immersion of the previously treated dependent capacitor discs and the adjacent portions of the terminal wire subassembly in engagement therewith in the solder contained within the now elevated solder ladle 506. Continued rotation of the drive cam 502 permits a return of the solder ladle 506 to the trough 508 to be there maintained during the next cycle of web advance.

In the illustrated apparatus, multiple solder dips for each of the web mounted capacitor subassemblies are preferably provided by making the solder ladle of sufficient length so as to permit an immersion therein of a plurality of the dependent ceramic discs on each upward displacement thereof.

As was the case with the drive cam in the flux dip station G heretofore described, the surface of the drive cam 502 should preferably be such as to effect a relatively slow rate of immersion of the web mounted ceramic capacitor discs in the solder ladle 506 so as to prevent cracking of the ceramic unit due to the elevated temperatures of the molten solder. On the down stroke, the rate of withdrawal should be relatively slow until the web mounted capacitor disc is almost entirely removed from the molten solder disposed within the solder ladle 506. At this point the speed of withdrawal of the solder ladle 506 should be increased so as to rapidly remove the remaining portion of the immersed capacitor from the molten solder. Such rapid removal of the solder in the solder ladle 506 from the ceramic disc aids materially in preventing miniscus or teardrop solder formation on the dependent end of the ceramic disc assembly.

Figure 4G:
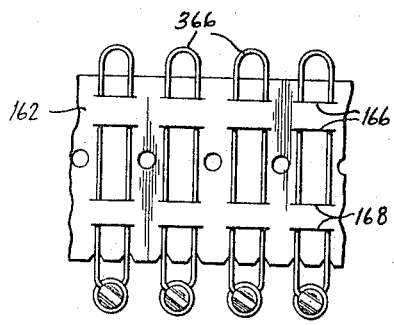

After passage through the flux and solder dip stations G and H as described above, the web mounted capacitor subassemblies are constituted as illustrated in FIGURE 4g wherein the terminal wires are both electrically and mechanically secured to the metallic electrode surfaces on the ceramic discs.

As mentioned earlier, it may be found desirable to interrupt the above described continuous process after passage of the web through the solder dip station H to permit batch-type degreasing operations. Continuous degreasing operations as illustrated in FIGURE 1 can be included. However, certain present-day practical and economic considerations lead to the preferential use of batch-type degreasing operations. Consequently, therefore, it is preferred to remove the web 162 and capacitor subassemblies mounted thereon from the rewind mandrel 122 (see FIGURE 1) and subject the same to batch degreasing operations. Subsequent to the degreasing operation, continuous type fabrication is resumed as best illustrated in FIGURE 3, to which I now turn.

As shown in FIGURE 3, continuous fabrication is resumed by placing a roll 520 of web mounted degreased capacitor subassemblies upon an unwinding mandrel 522. The web material is intermittently drawn in increments equal to the spacing between successive pilot pin perforations 164 therein from the unwind mandrel 522 by the action of a plurality of suitably driven guide rollers 524, 526, 528 and 530 located to define the path of travel of the web and provided with extending pilot pins 532 thereon spaced to drivingly engage successive pilot pin indexing perforations 164 in the web 162 of dispensable material. The path of travel of the web 162, as defined by the above-identified guide rollers, includes sequential passage of the web and capacitor subassemblies mounted thereon through a terminal straightening station L, wherein any deformation of the terminal wire portions of the web mounted capacitor subassemblies incurred during the degreasing operation is removed, through a subassembly positioning station M, wherein the height of the dependent web mounted ceramic capacitor units relative to the centerline of the web 162 is carefully preset, through an insulation dip station N, wherein the dependent ceramic capacitor discs and adjacent portions of the terminal leads secured thereto are given an insulating coating of predetermined thickness, through a web reversing station O wherein the dependent coated ends of the web mounted capacitor subassemblies are elevated to prevent undesired drop formation on the dependent ends thereof by the drying insulating coating, through an elongate drying path to permit at least partial setting of the external coating and which includes a wire cutting station P, wherein the rounded extending ends of the web mounted terminal leads are severed to provide discrete terminal leads selectively connected to the electrode surfaces on the capacitor discs and into a rewind station Q wherein the web 162 and capacitor units mounted thereon are rewound upon a rewind mandrel 534 with an interleaved spacing belt to assure separation between successive layers of the still not completely dry web mounted capacitor units. The roll is then preferably removed from the mandrel 534 and bath dried prior to further processing through the testing and marking stations as illustrated in FIGURE 1.

I will here follow the procedure heretofore established and will generally describe the nature of the essential mechanical elements that may be included in the above identified operating stations to effect the necessary mechanical operations in the practice of the process. Such description, however, will, in the interests of bravity, omit the details of the drive mechanism necessary to effect the indicated modes of operation as such are matters of machine design and are well within the skill of the art.

11. *The terminal straightening station*

FIGURES 45 and 46 illustrate the essentials of the presently preferred mechanical elements includable in the terminal straightening station L, wherein any deformation of the terminal wire portions of the web mounted capacitor subassemblies incurred during the batch degreasing operation are removed prior to further processing operations.

Referring to the above identified drawings, there is provided a fixed web guide and straightening member 540 sized to abut the web 162 in such manner as to permit the dependent ceramic capacitor discs 429 to extend beyond the area of possible compressive contact therewith as illustrated in FIGURE 46. Operatively associated with the straightening element 540 is a displaceable pressure member 542 pivotally mounted as at 544 and having a cam follower supporting arm 546 secured thereto. Mounted at the end of the cam follower supporting arm 536 is an extending cam follower 548 adapted to engage the surface of a contoured drive cam 550 mounted on a rotatable shaft 554. The displaceable pressure member 542 is provided with an operating surface 547 biased by the spring 543 to compressively engage the web mounted terminal portions of the capacitor subassemblies intermediate said surface and the fixed member 540.

In operation of the above described unit, the movable member 542 is normally biased by the spring 543 in compressive relation with the fixed member 540. During the portion of the operating cycle devoted to the web advance, rotation of the cam 550 serves to pivotally displace the cam follower supporting arm 546 against the action of the spring 543 and thereby maintain the movable element 542 separated from the fixed element 540. Upon cessation of web advance, further rotation of the cam 550 results in disengagement of the cam follower 548 from the operating surface thereof and in permitted pivotal displacement of the movable element 542 into compressive engagement with the web material and mounted terminal assemblies disposed intermediate said movable element and said fixed straightening element 540 by the spring 543. The above described compressive engagement serves to minimize, if not eliminate, any deformities in the terminal wire portions of said web mounted capacitor subassemblies that might have been incurred during the batch degreasing operations thereon.

12. *The subassembly positioning station*

FIGURES 47, 48 and 49 illustrate the essentials of the presently preferred mechanical elements includable in the subassembly positioning station M wherein the individual web mounted capacitor subassemblies are carefully positioned relative to the web 162 so as to assure uniform alignment thereof preceding their passage through the insulation dip station N.

Referring to the above identified drawings, there is provided a vertically displaceable U-shaped positioning element having the base 560 thereof positioned substantially parallel to the plane of the web 162 and the extending arms 562 and 564 thereof positioned above and below the web mounted capacitor subassemblies as said web 162 is positioned in engagement with the surface of the guide roller 524. The U-shaped element is mounted at one end of a pivotally mounted rocker arm 566. A cam follower 568 is mounted on the other end of the rocker arm 566 and is disposed in operative engagement with a drive cam 570 mounted on said shaft 554.

In operation of the unit, the extending arms 562 and 564 of the U-shaped element are positioned out of contact with the web mounted capacitor subassemblies during the portion of the operating cycle devoted to web advance. Upon cessation of web advance, the rocker arm 566 is pivotally displaced, under the action of the drive cam 570 so as to cause engagement of the extended rounded ends 571 of the web mounted capacitor subassemblies by the extending arm 562 and downward displacement of said web mounted capacitor subassemblies relative to the web 162 past the desired positioning thereof.

Upon cessation of downward displacement, the U-shaped element is upwardly displaced a predetermined amount. The upward displacement thereof results in the lower extending arm 584 engaging the dependent portions of the previously downwardly displaced web mounted capacitor subassemblies and in an upward displacement thereof relative to the web 162 by an amount controlled by the amount of displacement of the U-shaped element. The controlled upward displacement of the U-shaped element assures that all of the engaged units are delivered from the positioning station M at a uniform height relative to said web 162.

13. *The insulation dip station*

FIGURES 50 and 51 illustrate the essentials of the presently preferred mechanical elements includable in the insulation dip station N wherein the dependent ceramic discs and adjacent portions of the terminal leads connected thereto are provided with an external coating of insulating material of predetermined depth and thickness.

Referring to the above identified drawings, there is provided a substantially vertically disposed supporting standard 576. Pivotally mounted thereon, as at 578, is a rocker arm 580 which supports an extending cam follower 582. One end 584 of the rocker arm 580 is biased by a tension spring 586 so as to maintain the cam follower 582 against the surface of a drive cam 588 mounted on the shaft 554. The other end 590 of the rocker arm 580 is pivotally connected to the upper end of a dependent link member 592. The lower end of the link member 595 is pivotally connected to one arm of a crank member 594 as at 596. The crank member 594 is mounted on and adapted to rotate with a horizontally disposed shaft 598. The other arm of the crank member 594 abuts an adjustable stop 600. Mounted on the shaft 598 is an elongate ladle 602 adapted to be displaced, upon rotative displacement of the shaft 598, into and out of a trough 604 containing external coating material of an insulating character in liquid form. Positioned above the limit of upward displacement of the ladle 602 is a vertically disposed web guide 606 adapted to carefully position the web 162 and the capacitor subassemblies mounted thereon relative to the path of displacement of said ladle 602.

In operation of the above described unit, the web 162 having the capacitor subassemblies mounted thereon is advanced through the guide 602 in increments equal to the spacing intermediate successive pilot pin indexing perforations 164 therein. During the portion of the operating cycle devoted to web advance, the ladle 602 is disposed so as to be immersed in the liquid insulating material contained within the trough 604, that is, the rocker arm 580 is positioned so that the link member 592 is in its lower position, with the arm of the crank member 594 being disposed out of engagement with the adjustable stop 600 and with the shaft 598 being positioned so that the ladle 602 is immersed in the trough 604. Upon cessation of web advance, rotation of the cam 588 permits displacement of the rocker arm 580 by the spring 586 in a clockwise direction (see FIGURE 51), raising the link member 592 and rotatively displacing the crank member 594 and shaft 598 in a clockwise direction. Rotative displacement of the shaft 598 effects a concurrent rotative displacement of the ladle 602 connected thereto with the limit of rotative displacement being controlled by the adjustable stop 600. The rotative displacement of the ladle member 602 results in a raising thereof from its immersed position in the trough 604 and in an immersion of the dependent web mounted capacitor discs in the insulating material contained therein. The limit of upward displacement of the ladle 602 may be carefully controlled by the adjustable stop 600 to permit careful control of the depth of immersion of the dependent ceramic discs and adjacent terminal leads thereon.

As illustrated, the elongate ladle 602 is preferably sized to permit immersion of a plurality of dependent ceramic disc capacitors during each operating cycle. The immersion of a plurality of units per operational cycle in conjunction with the above described incremental advance of the web mounted capacitor subassemblies permits ready control of the number of immersions of each web mounted capacitor subassembly and thereby permits ready control of the desired coating thickness of insulating material.

The surface contour of the drive cam 588 preferably should be such as to effect an initial relatively slow rate of withdrawal of the ladle 602 from the immersed web mounted ceramic capacitor units to permit draining of excess insulating material therefrom. When the insulating material ladle 602 has been withdrawn to a point where the web mounted ceramic capacitor discs are almost entirely removed from the insulating material, the speed of withdrawal of the ladle 602 should preferably be increased so as to effect a rapid separation of the insulating material from the capacitor units. Such speed control aids materially in preventing undue miniscus or teardrop formation of the viscous insulating material on the dependent ends of the web mounted capacitor units.

Figure 4H:
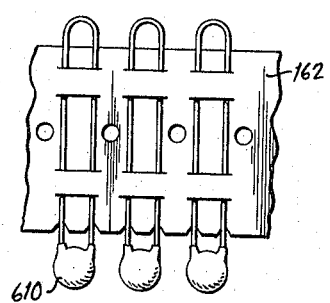

After passage through the insulation dip station N, the web mounted capacitor subassemblies are constituted as illustrated in FIGURE 4h wherein the ceramic discs and predetermined portions of the terminal leads connected thereto are provided with an external coating of insulating material of controllable thickness as indicated at 610 thereon.

14. The strip reversal station

In order to prevent undesired thickening of the insulating coating, due to flow thereof on the dependent portions of the web mounted capacitor subassemblies, it is preferred, when the characteristics of the insulating material so require, to effect a reversal of web position, so as to elevate the dependent coated portions thereof.

Figure 4I:
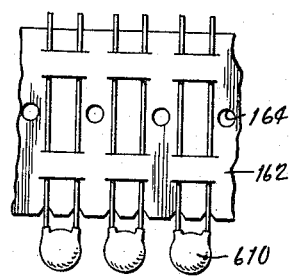

Web reversal is readily effected as shown in FIGURE 3 by the utilization of two pairs of idler guide rollers 612 and 614. Subsequent to web reversal the web and capacitor subassemblies mounted thereon are directed through an elongate drying path to permit preliminary setting of the insulating coatings thereon. Included in said elongate drying path is a terminal lead cutting station P wherein the extending rounded end portions 366 of the terminal assemblies are severed so as to provide discrete terminal leads connected to each of the electrode surfaces of the ceramic disc capacitor units. As schematically shown in FIGURE 3, such severing of the extending rounded end portions is readily effected by a reciprocable punch plate 616 operating in conjunction with a fixed die plate. After issuing therefrom the web mounted capacitor units are constituted as illustrated in FIGURE 4i.

In operation of the above described unit, it has been found preferable to wind the web mounted capacitor units as above constituted upon a rewind mandrel 534 to permit batch oven drying operations thereon. If such a procedure is followed it may be also desirable to employ an interleaving belting strip to space the wound capacitor units in the event the insulating material employed is of a character that does not completely set in the drying time afforded by the elongate drying path.

Processing the web mounted capacitor units through batch oven drying operations results in the provision of pluralities of finished ceramic disc capacitor units package mounted on said web of dispensable conveyor material. Subsequent thereto the units may be passed, while still web mounted, through voltage and capacity test stations as illustrated in FIGURE 1 and through any desired counting and marking procedures as would be required by particular customer demands.

It will be further appreciated that with the arrangements described the articles remain securely held in position in the same strip of material throughout their manufacture, assembly, testing, marking, packaging and delivery. This has many advantages, among which may be especially mentioned the avoidance of risk of confusion with articles of generally similar appearance but with different characteristics, as for example can frequently arise with hand packaging when the article happens to be one of a range of similar articles with different ratings. In addition, the cost of the dispensable conveyor strip is extremely small in comparison to the cost of the units mounted thereon, for example, the cost of 500 finished capacitors of the type described herein would be in the order of $18.00 to $20.00 whereas the cost of 50 feet of strip conveyor material on which the units would be mounted would be at best in the order of a few cents.

Having thus described my invention, I claim:

1. In an automatic cyclically operable ceramic disc capacitor fabricating machine, means at a first location for introducing a predetermined pattern of longitudinally disposed and uniformly spaced slits in an elongate web conveyor, means at a second location for deforming the slit portions of said web material to form transversely disposed terminal wire subassembly receiving channels therein, means associated with said last mentioned means for forming and inserting U-shaped terminal wire subassemblies into said receiving channels to provide web mounted terminal wire subassemblies, means at a third location for defroming the separated end portions of said U-shaped terminal wire subassemblies to prepare the same for receipt of ceramic disc capacitor elements, means at a fourth location for inserting ceramic capacitor disc intermediate the deformed portions of said web mounted terminal wire subassemblies, means at a fifth location for soldering said discs to said deformed portions of said web mounted terminal wire subassemblies, said means being cyclically operable by drive mechanisms thereof, and feeding means having drive means coordinated with said drive mechanisms for advancing said web conveyor in sequence past said first to fifth locations intermittently with intermediate dwell periods and for arresting respective portions of the web conveyor in cooperative positions adjacent said cyclically operable means, said feeding means being cyclically operable by drive means coordinated with said drive mechanisms so that the cyclically operable means effect their operations as aforesaid on the web conveyor and on the successive subassemblies carried thereby during the dwell periods.

2. In an automatic cyclically operable ceramic disc capacitor fabricating machine, means for introducing a predetermined pattern of transversely spaced longitudinally extending pairs of slits in an elongate web conveyor at one location, means for deforming said slit portions of said web material at a second location to form terminal wire subassembly receiving channels therein, means associated with said last mentioned means for forming and inserting generally U-shaped terminal wire subassemblies into said receiving channels in said web material to provide web mounted terminal wire subassemblies, means for deforming portions of said web mounted terminal wire subassemblies at a third location to prepare the same for receipt of ceramic disc capacitor elements, means for inserting prepared ceramic capacitor discs having electrode facings on the opposite sides thereof intermediate said deformed portions of said web mounted terminal wire subassemblies at a fourth location to form web mounted capacitor subassemblies, means for immersing portions of said web mounted capacitor subassemblies in a bath of flux material at a fifth operating station, means for immersing said flux treated portions of said web mounted capacitor subassemblies in a bath of solder material at a sixth location to permanently secure said discs to said deformed portions of said web mounted terminal wire subassemblies, said means being cyclically operable by drive mechanism thereof, and feeding means for advancing the web conveyor in sequence past said one through sixth locations intermittently to provide dwell periods and for arresting respective portions of the web conveyor in cooperative positions adjacent said cyclically operable means, said feeding and arresting means having drive mechanism coordinated with that of said cyclically operable means so that the latter operate as aforesaid on the web conveyor and on the successive subassemblies carried thereby during the dwell periods.

3. In a ceramic disc capacitor fabricating machine of the class wherein an advancing elongate web of dispensable conveyor material serves as a carrier for the capacitor unit constituent elements and progressively formed subassemblies thereof during the sequential stages of the fabricating process, apparatus for positioning web mounted subassemblies in a predetermined desired transverse positional relation to the longitnudinal dimension of said web material comprising means for supporting said web material, means for selectively transversely engaging and displacing each of said web mounted subassemblies in one direction relative to the longitudinal dimension of said web beyond said desired predetermined relation therewith and means responsive to said first mentioned displacement for engaging and transversely displacing each of said displaced subassemblies in the opposite direction relative to said web with the selective limit of displacement thereof being determinative of said predetermined desired positional relationship therebetween.

4. In combination, means providing a supply of dispensable conveyor strip material, means for perforating said strip at regular spaced intervals, means for forming at least a pair of transversely aligned longitudinally extending slits in said strip material at locations that recur regularly in uniform relationship to said perforations, cyclically operable means for forming successively a series of hairpin-shaped wire elements each having a pair of legs and a bowed portion interconnecting said legs and for inserting each of said wire elements successively into respective pairs of slits in the strip material with end portions of the wire element projecting free of the strip material, means for bending the pair of projecting end portions of each of the wire elements carried by said strip material to form a pair of crossed end portions, means for inserting ceramic condenser bodies successively between the pairs of crossed end portions of respective wire elements carried by the strip material, means for soldering inserted condenser bodies successively to respective bent end portions of the wire elements engaged thereby, and feed means having elements cooperating with the perforations in the strip material for feeding said strip material from said supply means stepwise along a continuous path through each of the other aforesaid means in the order named, each of the aforesaid means being cyclically operable by drive mechanism therein, and said feed means including means to arrest the strip material during successive dwell periods in coordination with the drive mechanisms of said cyclically operable means in precise positions adjacent to the other aforesaid means concurrently so that the successive pairs of slits and the succession of elements respectively carried therein are in position for operation thereon by said other aforesaid means during the successive dwell periods.

5. In combination, means providing a supply of dispensable conveyor strip material, means forming at least a pair of transversely aligned longitudinally extending slits in said strip material at spaced locations along the strip material, means for forming successively a series of hairpin-shaped wire elements each having a pair of legs and a bowed portion interconnecting said legs and for inserting each of said wire elements successively into respective pairs of slits in the strip material with end portions of the wire element projecting free of the strip material, means for bending the pair of projecting end portions of each of the wire elements carried by said strip material to form a pair of crossed end portions, means for inserting ceramic condenser bodies successively between the pairs of crossed end portions of respective wire elements carried by the strip material, means for soldering inserted condenser bodies successively to respective bent end portions of the wire elements engaged thereby, and feed means cyclically operable for feeding said strip material from said supply means stepwise along a continuous path through each of the other aforesaid means in the order named and to arrest the strip material during successive dwell periods in precise positions adjacent to the other aforesaid means concurrently, each of said means being cyclically operable by drive mechanisms thereof, and means coordinating said drive mechanisms so that the successive pairs of slits and the succession of elements respectively carried therein are in position for operation thereon by said other aforesaid means.

References Cited by the Examiner

UNITED STATES PATENTS 2,766,510  10/1956  Heibel _____ 29—25.42
2,929,130   3/1960  Packman _____ 29—25.42

JOHN F. CAMPBELL, *Primary Examiner.*

WILLIAM I. BROOKS, *Examiner.*